US006961930B1

(12) United States Patent
Waldspurger et al.

(10) Patent No.: US 6,961,930 B1
(45) Date of Patent: Nov. 1, 2005

(54) EFFICIENT, TRANSPARENT AND FLEXIBLE LATENCY SAMPLING

(75) Inventors: Carl A. Waldspurger, Atherton, CA (US); Michael Burrows, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/540,952

(22) Filed: Mar. 31, 2000

Related U.S. Application Data

(63) Continuation-in-part of application No. 09/401,616, filed on Sep. 22, 1999.

(51) Int. Cl.[7] .................................................. G06F 9/45
(52) U.S. Cl. ....................... 717/141; 717/139; 717/131
(58) Field of Search ................................ 717/124–151

(56) References Cited

U.S. PATENT DOCUMENTS

| | | | | | |
|---|---|---|---|---|---|
| 4,821,178 | A | | 4/1989 | Levin et al. | 364/200 |
| 4,845,615 | A | | 7/1989 | Blasciak | 364/200 |
| 5,103,394 | A | | 4/1992 | Blasciak | 395/575 |
| 5,450,586 | A | | 9/1995 | Kuzara et al. | 395/700 |
| 5,479,652 | A | | 12/1995 | Dreyer et al. | 395/183.06 |
| 5,485,574 | A | | 1/1996 | Bolosky et al. | 395/183.11 |
| 5,493,673 | A | | 2/1996 | Rindos, III et al. | 395/550 |
| 5,528,753 | A | | 6/1996 | Fortin | 395/183.11 |
| 5,537,541 | A | | 7/1996 | Wibecan | 395/183.21 |
| 5,572,672 | A | | 11/1996 | Dewitt et al. | 395/184.01 |
| 5,581,482 | A | | 12/1996 | Wiedenman et al. | 364/551.01 |
| 5,651,112 | A | | 7/1997 | Matsuno et al. | 395/184.01 |
| 5,796,939 | A | | 8/1998 | Berc et al. | 395/184 |
| 5,809,450 | A | | 9/1998 | Chrysos et al. | 702/186 |
| 5,857,097 | A | | 1/1999 | Henzinger et al. | 395/583 |
| 5,872,976 | A | * | 2/1999 | Yee et al. | 717/127 |
| 5,923,872 | A | | 7/1999 | Chrysos et al. | 395/591 |
| 5,964,867 | A | | 10/1999 | Anderson et al. | 712/219 |
| 6,000,044 | A | | 12/1999 | Chrysos et al. | 714/47 |
| 6,009,514 | A | | 12/1999 | Henzinger et al. | 712/236 |
| 6,016,557 | A | * | 1/2000 | Kasprzyk et al. | 714/38 |
| 6,070,009 | A | | 5/2000 | Dean et al. | 395/704 |
| 6,071,316 | A | * | 6/2000 | Goossen et al. | 717/127 |
| 6,134,710 | A | * | 10/2000 | Levine et al. | 717/127 |
| 6,308,318 | B2 | * | 10/2001 | Krishsaswamy | 717/139 |

OTHER PUBLICATIONS

Calder, B. et al., *"Value Profiling,"* Proceedings Thirtieth Annual IEEE/ACM International Symposium on Microarchitecture, Dec. 1997, pp. 259-269.
Dean, J., et al., *"ProfileMe: Hardware Support for Instruction-Level Profiling on Out-of Order Processors,"* 1997, IEEE, Published in the Proceedings of Micro-30, Dec. 1-3, 1997, 12 pages.
Anderson, J.M., *"Continuous Profiling: Where have all the Cycles Gone?,"* Thirtieth Annual IEEE/ACM International Symposium on Microarchitecture, Dec. 1-3, 1997, pp. 1-20; Also appeared in the 16th ACM Symposium on Operating System Principles, Oct. 5-8, 1997.

(Continued)

*Primary Examiner*—Tuan Dam
*Assistant Examiner*—Chuck Kendall

(57) ABSTRACT

The performance of an executing computer program on a computer system is monitored using latency sampling. The program has object code instructions and is executing on the computer system. At intervals, the execution of the computer program is interrupted including delivering a first interrupt. In response to at least a subset of the first interrupts, a latency associated with a particular object code instruction is identified, and the latency is stored in a first database. The particular object code instruction is executed by the computer such that the program remains unmodified.

36 Claims, 14 Drawing Sheets

OTHER PUBLICATIONS

Gibbons, P.B., et al., *"New Sampling-Based Summary Statistics for Improving Approximate Query Answers,"* Proc.ACM SIGMOD, 1998.

Lipasti, M.H., et al., *"Value Locality and Load Value Prediction,"* Seventh International Conference on Architectural Support for Programming Languages and Operating Systems, Oct. 1996.

Lipasti, M.H., et al., *"Exceeding the Dataflow Limit via Value Prediction,"* Proceedings of the 29th Annual Symposium on Microarchitecture, Dec. 1996.

Dean, Jeffrey, et al., *"Transparent, Low-Overhead Profiling on Modern Processors,"* Compaq Computer Corporation, 3 pgs.

Anderson, Jennifer M., et al., Digital: SRC Technical Note 1997-016a, *Continuous Profiling: Where Have All the Cycles Gone?*, 1p. Available Web Site: http://gatekeeper.dec.com/pub/DEC/..tes/abstracts/src-tn-1997-016.html;Modified Sep. 3. 1997.

Anderson, Jennifer M., et al., Digital SRC, Continuous Profiling—Abstract for HotChips9 Presentation, *"Continuous Profiling: (It's 10:43; Do you Know Where Your Cycles Are?,"* 1-2. Accessed Mar. 24, 2000. Available Web Site: http://www.research.digital.com/SRC/dcpi/papers/hotchips9-abstract.html.

Weihl, William E., Digital Systems Research Center, CPI: Continuour Profiling Infrastructure, *"Digital Continuous Profiling Infrastructure,"* 1-3. Available Web Site: http://www.research.digital.com/SRC/articles/199703/dcpi.html, Last modified Dec. 7, 1999.

Digital Equipment Corporation (1996, 1997). Digital Continuous Profiling Infrastructure Project, *"Digital Continuous Profiling Infrastructure, HotNews V2.11 Available!,"* 1-1. Available Web Site: http://www.research.digital.com/SRC/dcpi/. Last modified Sep. 10, 1998.

Berc, Lance, et al., Digital Continuous Profiling Infra . . . '96 Work-In-Progress Presentation. *"Digital Continuous Profiling Infrastructure,"* 1-2. Available Web Site: http://www.research.digital.com/SRC/dcpi/papers/osdi96-wip.html, Last modified May 5, 1997.

Digital Equipment Corporation (1996, 1997). Documentation: Digital Continuous Profiling Infrastructure, *"Documentation,"* 1-3. Available Web Site: http://www.research.digital.com/SRC/dcpi/documentation.html, Last modified Dec. 2, 1997.

Digital Equipment Corporation (1996, 1997). Publications and Talks: Digital Continuous Profiling Infrastructure, *"Publications and Talks,"* 1-2. Available Web Site: http://www.research.digital.com/SRC/dcpi/pubs-and-talks.html. Last modified Feb. 2, 1999.

Weihl, William E., Digital Systems Research Center. CPI: Continuous Profiling Infrastructure, *"Digital Continuous Profiling Infrastructure,"* 1-3. Available Web Site: http://www.research.digital.com/SRC/articles/199703/dcpi.html. Last modified Mar. 25, 1997.

* cited by examiner

Data Collection System Overview

EFFICIENT, TRANSPARENT AND FLEXIBLE LATENCY SAMPLING

This patent application is a continuation-in-part of U.S. patent application Ser. No. 09/401,616 filed Sep. 22, 1999.

The present invention relates generally to computer systems, and more particularly to collecting performance data in computer systems.

BACKGROUND OF THE INVENTION

Collecting performance data in an operating computer system is a frequent and extremely important task performed by hardware and software engineers. Hardware engineers need performance data to determine how new computer hardware operates with existing operating systems and application programs.

Specific designs of hardware structures, such as processor, memory and cache, can have drastically different, and sometimes unpredictable utilizations for the same set of programs. It is important that flaws in the hardware be identified so that they can be corrected in future designs. Performance data can identify how efficiently software uses hardware, and can be helpful in designing improved systems.

Software engineers need to identify critical portions of programs. For example, compiler writers would like to find out how the compiler schedules instructions for execution, or how well execution of conditional branches are predicted to provide input for software optimization. Similarly, it is important to understand the performance of the operating system kernel, device driver and application software programs. The performance information helps identify performance problems and facilitates both manual tuning and automated optimization.

Accurately monitoring the performance of hardware and software systems without disturbing the operating environment of the computer system is difficult, particularly if the performance data is collected over extended periods of time, such as many days, or weeks. In many cases, performance monitoring systems are custom designed. Costly hardware and software modifications may need to be implemented to ensure that operation of the system is not affected by the monitoring systems.

One method of monitoring computer system performance stores the addresses of the executed instructions from the program counter. Another method monitors computer system performance using hardware performance counters that are implemented as part of the processor circuitry. Hardware performance counters "count" occurrences of significant events in the system. Significant events can include, for example, cache misses, a number of instructions executed, and I/O data transfer requests. By periodically sampling the counts stored in the performance counters, the performance of the system can be deduced.

Data values, such as the values of hardware registers and memory locations, are also useful in developing performance profiles of programs. Value usage patterns indicate which values programs repeatedly use. Such patterns can be used to perform both manual and automated optimizations. One prior art method adds instrumentation code to the program to be profiled and collects data values. However, the instrumentation code increases overhead. In addition, instrumentation based approaches do not allow overall system activity to be profiled such as the shared libraries, the kernel and the device drivers. Although simulation of complete systems can generate a profile of overall system activity, such simulations are expensive and difficult to apply to workloads of production systems.

It is also useful to measure the execution time of load and store instructions in executing computer programs. The load and store instructions access the memory, and the execution time of the load or store instruction is equal to the memory access time or memory latency. Typically, special hardware is required to measure the memory latency. Other methods require that a program being profiled be modified.

Therefore, a method and system are needed to perform value profiling of memory latencies that requires no changes to programs and requires no hardware modifications.

Different levels of memory (for example, L1 cache, L2 cache and main DRAM memory) have different access times. In particular, load instructions may access any one of the levels of memory. Therefore, the method and system should also identify which level of memory was accessed by a load instruction. The method and system should also monitor memory latency without modifying the computer program and allow the monitoring of shared libraries, the kernel and device drivers, in addition to application programs.

SUMMARY OF THE INVENTION

The performance of an executing computer program on a computer system is monitored using latency sampling. The program has object code instructions and is executing on the computer system. At intervals, the execution of the computer program is interrupted including delivering a first interrupt. In response to at least a subset of the first interrupts, a latency associated with a particular object code instruction is identified, and the latency is stored in a first database. The particular object code instruction is executed by the computer such that the program remains unmodified.

The present invention enables the dynamic cost of operations to be measured, such as the actual latencies experienced by loads in executing programs. In another embodiment, the latency of sampled operations is estimated via statistical sampling. In an alternate embodiment, memory latencies are sampled. In yet another embodiment, the level of the memory hierarchy that satisfied a memory operation is identified.

The present invention has several advantages. First, the present invention works on unmodified executable object code, thereby enabling profiling on production systems.

Second, entire system workloads can be profiled, not just single application programs, thereby providing comprehensive coverage of overall system activity that includes the profiling of shared libraries, kernel procedures and device-drivers. Third, the interrupt driven approach of the present invention is faster than instrumentation-based value profiling by several orders of magnitude.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
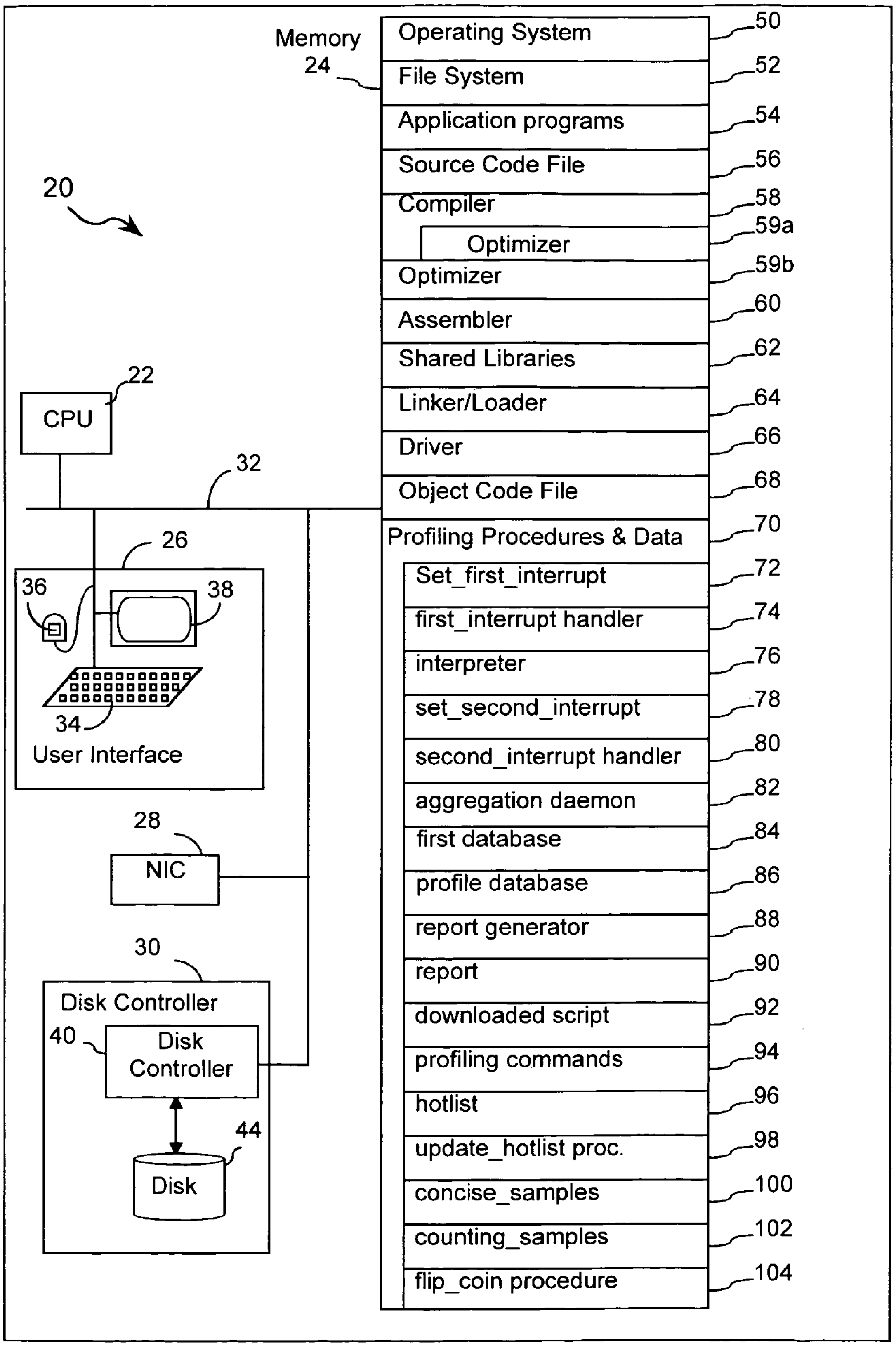
FIG. 1 is a diagram of a computer system using the present invention.

As shown in FIG. 1, in a computer system 20, a central processing unit (CPU) 22, a memory 24, a user interface 26, a network interface card (NIC) 28, and disk storage system 30 are connected by a system bus 32. The user interface 26 includes a keyboard 34, a mouse 36 and a display 38. The memory 24 is any suitable high speed random access memory, such as semiconductor memory. The disk storage system 30 includes a disk controller 40 that connects to disk drive 44. The disk drive 44 may be a magnetic, optical or magneto-optical disk drive.

The memory 24 stores the following:

- an operating system 50 such as UNIX.
- a file system 52;
- application programs 54;
- a source code file 56, the application programs 54 may include source code files;
- a compiler 58 which includes an optimizer 59*a;*
- an optimizer 59*b* separate from the compiler 58;
- an assembler 60;
- at least one shared library 62;
- a linker 64;
- at least one driver 66;
- an object code file 68; and
- a set of profiling system procedures and data 70 that include the performance monitoring system of the present invention.

The profiling system procedures and data 70 include:

- a set_first_interrupt procedure 72;
- a first interrupt handler 74;
- an interpreter 76;
- a set_second_interrupt procedure 78;
- a second interrupt handler 80;
- an aggregation daemon 82;
- a first database 84;
- a profile database 86;
- a report generator 88;
- at least one report 90;
- a downloaded script 92;
- profiling commands 94;
- at least one hotlist 96;
- an update_hotlist procedure 98;
- a counting samples procedure 100;
- a concise_samples procedure 102; and
- a flip_coin procedure 104.

The programs, procedures and data stored in the memory 24 may also be stored on the disk 44. Furthermore, portions of the programs, procedures and data shown in FIG. 1 as being stored in the memory 24 may be stored in the memory 24 while the remaining portions are stored on the disk 44.

Preferably, the profiling system 70 is the Digital Continuous Profiling Infrastructure (DCPI) manufactured by COMPAQ.

Data Collection Profiling

Figure 2:
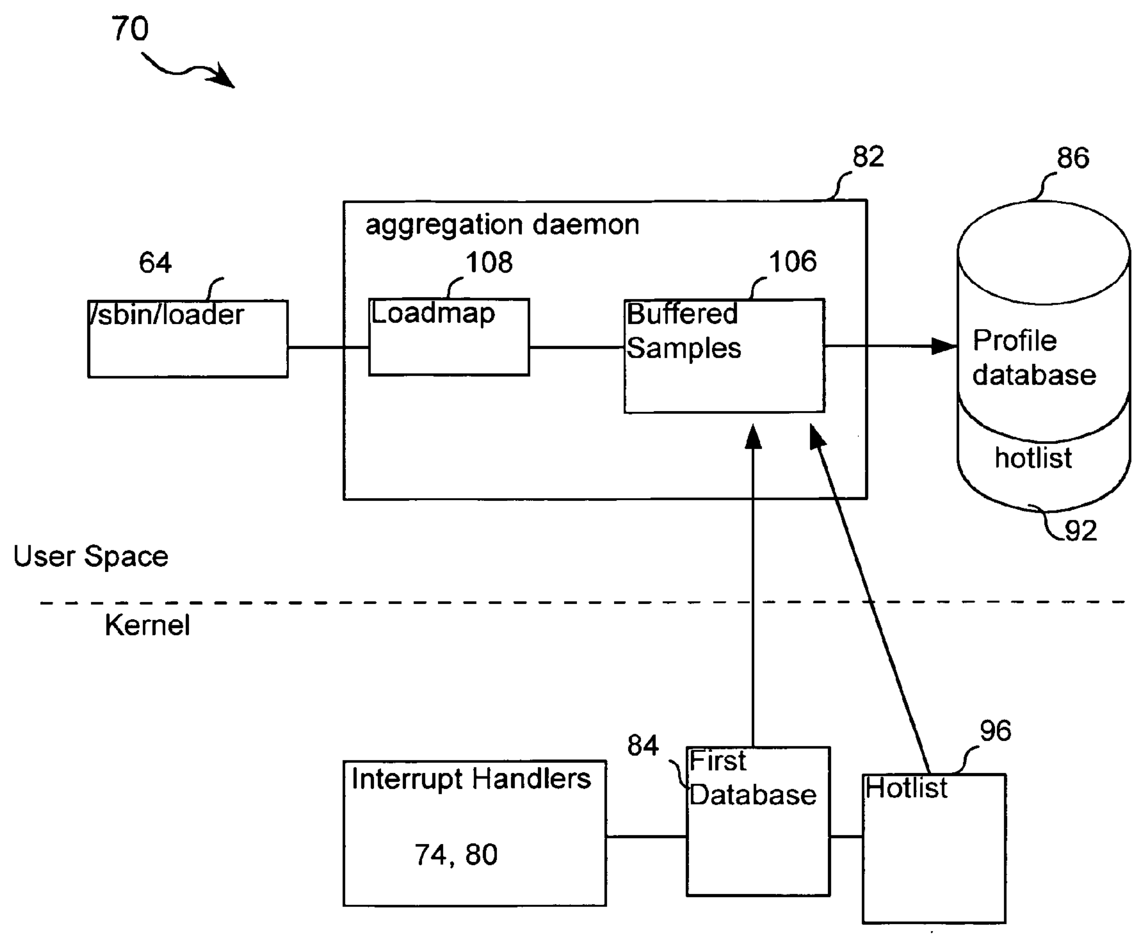
FIG. 2 is a block diagram of a profiling system using the methods of the present invention of FIG. 1.

As shown in FIG. 2, the programs and data structures 70 of the profiling system of FIG. 1 are designated as either user-mode or kernel mode. The user-mode components include the aggregation daemon process 82, one or more user buffers 106, and the profile database of processed performance data 86. The kernel-mode components include the first interrupt handler 74, the second interrupt handler 80, device driver 66 and buffer (first database) 84. The kernel-mode components are not directly accessible to the typical user without certain specified privileges.

In the profiling system 70, a profile database 86 stores data values and associated information. The profile database 86 is preferably stored in a disk drive, but the data values and associated information are not stored directly into the profile database 86. Rather, a kernel-mode interrupt handler populates the first database 84 with the data values. The first database 84 is a buffer. Depending on the embodiment, which will be discussed below, the kernel-mode interrupt handler includes the first interrupt handler 74 (FIG. 1), the second interrupt handler 80, and those interrupt handlers 74, 80 populate the first database 84.

The aggregation daemon process 82 maintains the profile database 86. During operation, the aggregation daemon process 82 periodically flushes the first database 84 into the buffer 106. The information in the buffer 106 is then used to update the profile database 86, as will be described in more detail below.

The aggregation daemon 82 accesses the loadmap 108 to associate the memory address of the interrupted instruction with an executing program or a portion of the executing program, such as a shared library. In addition, the aggregation daemon process 82 associates the data values retrieved from the first database 84 with any one or a combination of the process identifier, user identifier, group identifier, parent process identifier, process group identifier, effective user identifier, and effective group identifier using the loadmap 108. The aggregation daemon process 82 also processes the accumulated performance data to produce, for example, execution profiles, histograms, and other statistical data that are useful for analyzing the performance of the system.

U.S. Pat. No. 5,796,939 is hereby incorporated by reference as background information on the aggregation daemon process 82 and the profile database 86.

The aggregation daemon creates and updates the hotlist 92 of data values that is also stored on the disk drive. Hotlists are described below with respect to FIG. 10.

In an alternate embodiment, the kernel-mode interrupt handler (74, 80, FIG. 1) performs some preliminary aggregation on the data values in the first database 84. For example, in this alternate embodiment the kernel-mode interrupt handler stores tuples of associated values, stores a hotlist of value-count pairs or tuples, or applies a function to the data values. Various types of aggregation will be further discussed below.

In another embodiment, the first database is an accumulating data structure, such as a hash table, and the values of interest are aggregated in the hash table. U.S. Pat. No. 5,796,939 is hereby incorporated by reference as background information on the accumulating data structure.

In an alternate embodiment, the first and second interrupt handlers associate one or more of the process identifier, user identifier, group identifier, parent process identifier, process group identifier, effective user identifier, effective group identifier with the data values in the first database 84.

Some processors may concurrently execute more than one instruction at a time, and the set of potentially concurrent instructions is referred to as an issue block. For example, an issue block may contain four instructions. To statistically sample all instruction executions, data values of interest are determined for the entire issue block and stored in the first database. During operation, an interrupt activates the first interrupt handler. Depending on the embodiment, either the first or the second interrupt handler acquires data values of interest for the instructions of the issue block, and stores the data values of interest.

Figure 3:
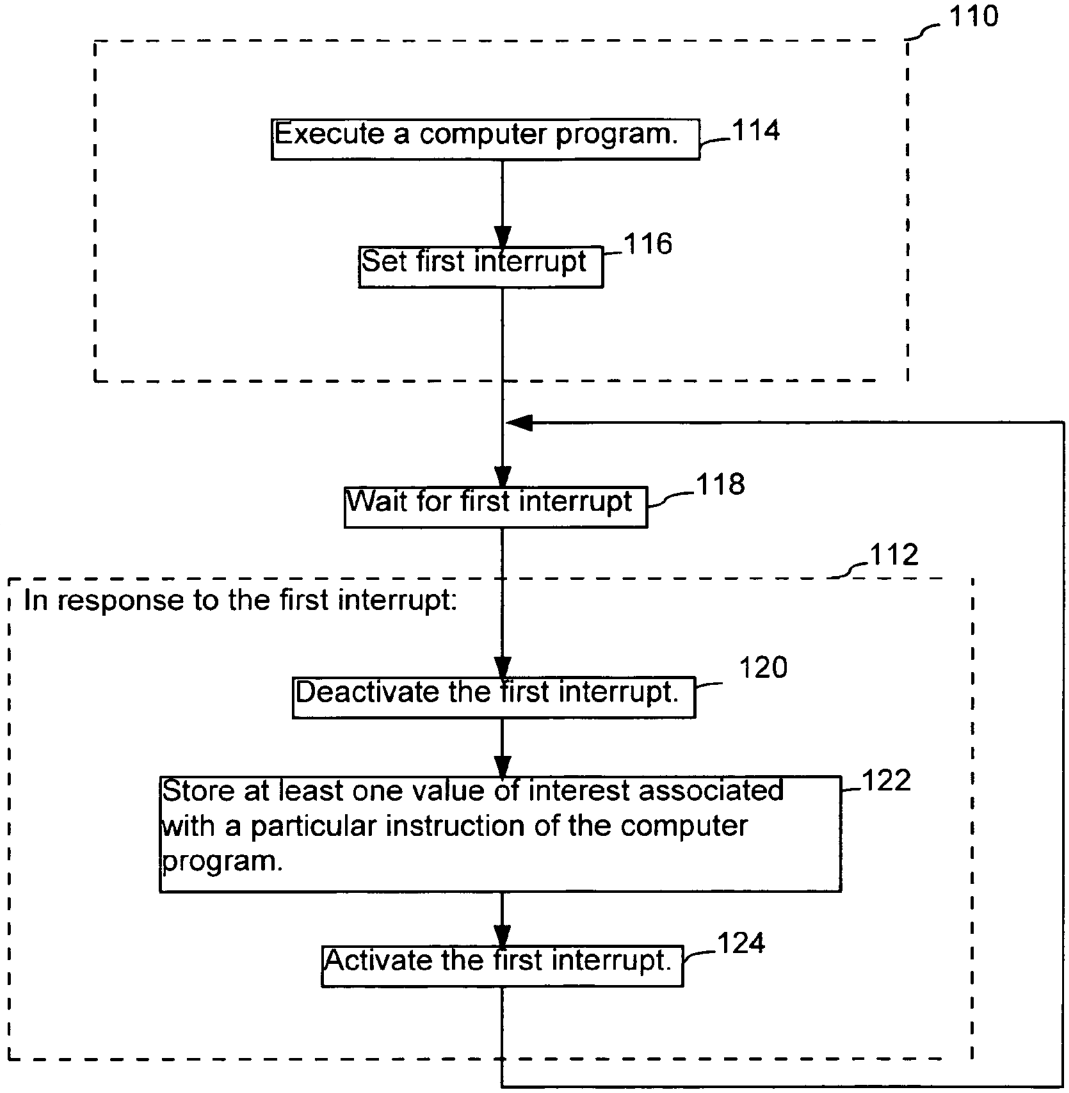
FIG. 3 is a flowchart of a method of the present invention implemented by the computer system of FIG. 1.

In FIG. 3, a general method of sampling data values for monitoring the performance of a program being executed on the computer system is shown. In general, the method of value sampling includes a first set 110 of steps that arranges for interrupts to be delivered, and a second set 112 of steps that processes the interrupts.

The first set of steps 110 are implemented in the set_first_interrupt procedure 72 of FIG. 1. In step 114, a program is executed on a computer system. The program includes object code or machine language instructions that are being executed on a processor. In one embodiment, the program is an application program that accesses shared libraries and uses system calls. In step 116, a first interrupt is configured using the set_first_interrupt procedure 72 of FIG. 1. In this description, the term "object code" includes machine language code. In step 118, the profiling system waits until the first interrupt occurs.

The second set of steps 112 are implemented in the first interrupt handler 74 of FIG. 1. The first_interrupt handler responds to the first interrupt. In step 120, the first_interrupt handler deactivates the first interrupt. In step 122, the first_interrupt handler stores at least one data value of interest associated with the computer program in a first database. The instruction at the memory address stored in the return program counter when the interrupt is delivered will be referred to as the interrupted instruction. The data value of interest is associated with a particular object code instruction of the program. The particular object code instruction may be the interrupted instruction. In step 124, before exiting the first_interrupt handler, the first interrupt is set or activated and the process repeats at step 118. Note that using this interrupt driven method, the executing program remains unmodified while the data values of interest are collected and stored in the first database.

The interrupts of the present invention can be software generated interrupts or hardware generated interrupts. Some processors have hardware cycle counters that are configured to generate a high priority interrupt after a specified number of cycles. Using the hardware cycle counters, the set_first_interrupt procedure 72 configures the hardware cycle counters to generate the first interrupt as the high priority interrupts.

The interrupts are generated at specific intervals. In one embodiment, the intervals have a substantially constant period such that the data values are sampled at a constant rate. The constant period is equal to a predetermined number of system clock cycles, for example, 62,000 cycles.

In a preferred embodiment, the intervals are generated at randomly selected intervals to avoid unwanted correlations in the sampled data values. In other words, the amount of time between interrupts is random. In a preferred embodiment the random intervals are generated by adding a randomly generated number (or pseudorandomly generated number) to a predetermined base number of cycles (e.g., 62,000 cycles) and loading that number in the cycle counter.

When the interrupt is delivered, the first_interrupt handler stores at least one data value of interest in the first database. The first interrupt handler stores many types of data values, where the type of data stored depends on the specific instruction or type of instruction for which the data is being stored. The data values that can be stored by the first interrupt handler include: an operand of an object code instruction, the result of the execution of an object code instruction, a memory address referenced by the object code instruction or a memory address that is part of the object code instruction, a current interrupt level, the memory addresses for load and store instructions, and data values stored in the memory addresses. The data values of interest can also include the value of the return program counter, register values and any other values of interest.

Note that at the time of the interrupt, the interrupted instruction will not have been executed. Therefore, the result of executing the instruction will not be available. For example, the data value of the destination register specified by the interrupted instruction will not have been determined at the time the interrupt occurred, or the direction of a conditional branch will not have been determined.

Note that the present invention includes two different methods to store the data values of interest that include the result of executing the interrupt instruction—an instruction interpretation method and a "bounce-back" interrupt method.

Instruction Interpretation

In the instruction interpretation method, the first interrupt handler fetches and interprets at least one issue block of instructions starting at the interrupted instruction. An interpreter (76, FIG. 1) emulates the instruction set of the underlying machine. For example, the profiling system for one processor includes an object or machine language interpreter in the kernel.

Figure 4:
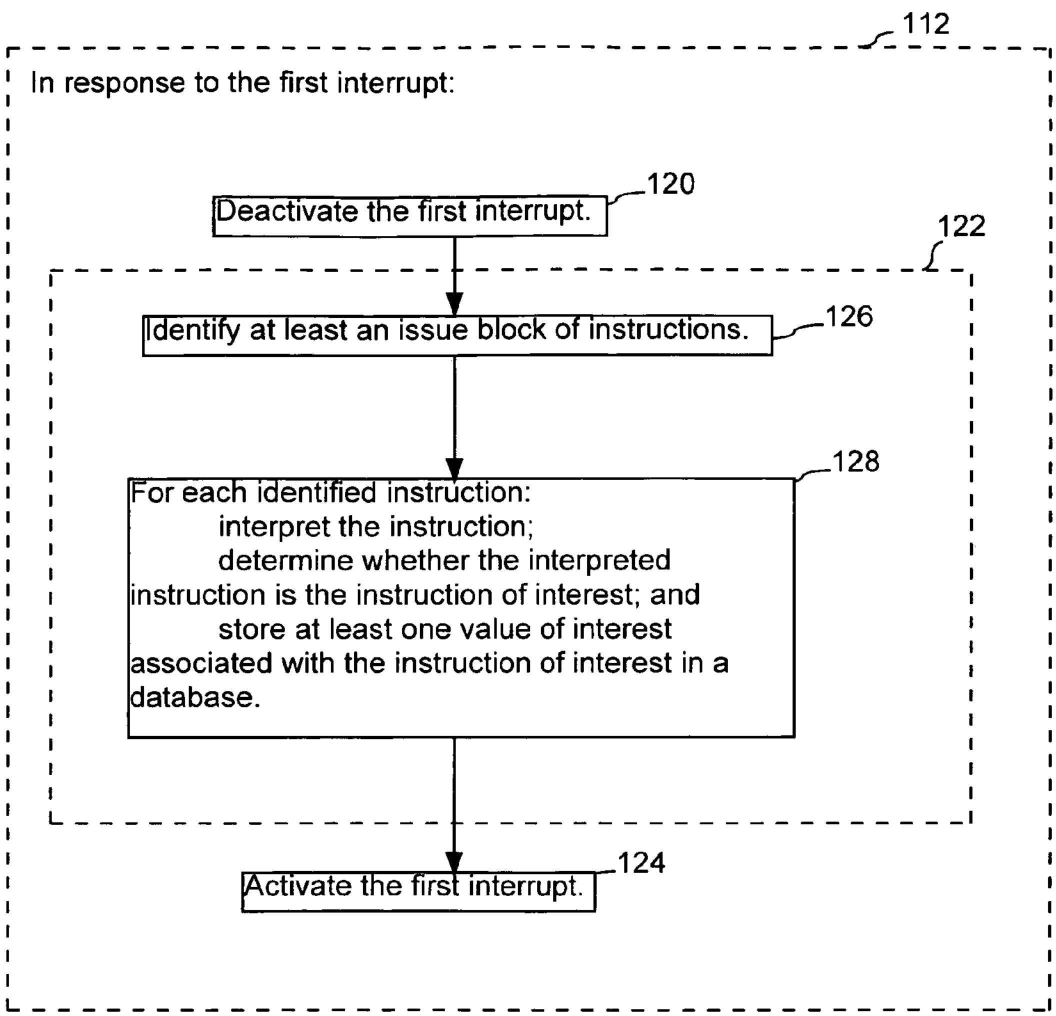
FIG. 4 is a flowchart of an instruction interpretation technique for storing the data values in the storing step of FIG. 3.

FIG. 4 shows step 122 of FIG. 3 in more detail. Therefore, only step 122 will be described. In FIG. 4, in the instruction interpretation approach, step 122 includes the following steps. In step 126, the first_interrupt handler identifies at least an issue block of instructions. In step 128, for each identified instruction, the first_interrupt handler invokes the interpreter 76 to interpret the instruction and generate the result of executing the instruction. The first_interrupt handler determines whether the interpreted instruction is an instruction of interest, and stores at least one data value of interest associated with the instruction of interest in the first database. Because the interpreter generates the result of executing the interrupted instruction, the first_interrupt handler can store the result of the execution of the instruction in the first database. The interpreter updates the state of the interrupted program as though each interpreted instruction had been directly executed by the processor.

Alternately, the first_interrupt handler does not determine whether the interpreted instruction is the instruction of interest, but handles all instructions in the issue block as instructions of interest and stores the data values associated with the instructions in the first database.

Bounce-Back Interrupt

In the following discussion, the term "capture" is used to mean storing a data value in the first database.

In an alternate method of storing or capturing data values, a bounce-back or second interrupt is generated in response to the first interrupt. The first_interrupt handler sets up the second interrupt to occur immediately after a second predetermined number of events have occurred after the first interrupt returns. In one embodiment, the events are instruction executions. The second predetermined number of instruction executions is small, such as the number of instructions in an issue block, which is typically four. In an alternate embodiment, the events are clock cycles. Since most instructions are executed in one clock cycle, the second predetermined number of clock cycles is also small, such as the number of instructions in an issue block, which is typically four.

The first_interrupt handler stores information identifying the interrupted instruction and any other instructions in the issue block in the first database. In response to the bounce-back or second interrupt, the second_interrupt handler stores the data values of interest in the first database. The second_interrupt handler associates the stored data values of interest with the corresponding instructions in the issue block.

Figure 5:
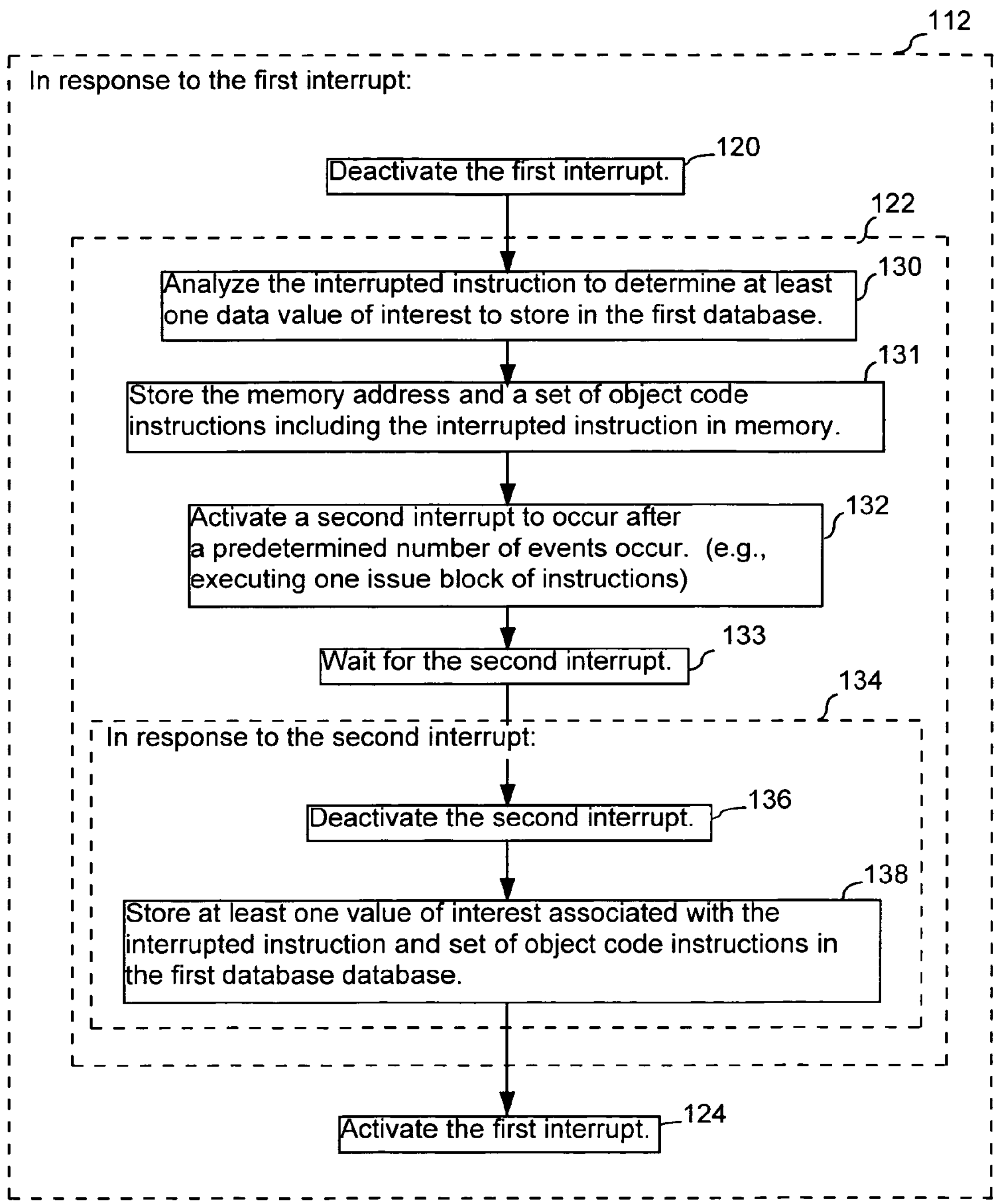
FIG. 5 is a flowchart of a bounce back technique for storing the data values in the storing step of FIG. 2.

FIG. 5 shows step 122 of FIG. 3 in more detail. In the bounce-back interrupt approach, in step 130, the first_interrupt handler analyzes the interrupted instruction to determine at least one data value of interest to store in the first database. In step 131, the first_interrupt handler stores the memory address of the interrupted instruction (the return program counter) and a set of object code instructions including the interrupted instruction. The set of object code instructions is an issue block. In step 132, the first interrupt handler activates a second interrupt using the set_second_interrupt procedure (78, FIG. 1), such that the second interrupt will occur after a predetermined number of events (e.g., the number of instructions in one issue block) occur after the first interrupt returns. In step 133, the method waits for the second interrupt to occur.

In response to the second interrupt, in step 136, the second_interrupt handler (80, FIG. 1) is executed. The second_interrupt handler implements steps 136 and 138 of FIG. 5. In step 136, the second_interrupt handler deactivates the second interrupt. In step 138, the second_interrupt handler stores at least one data value of interest associated with the interrupted instruction and the set of instructions in the first database. In this way, the second_interrupt handler captures the result of executing the issue block of instructions in the first database. Therefore, the value stored in the destination register can be stored in the first database.

Note that, in both the instruction interpretation and bounce back interrupt approaches for an executing program, values of interest can be stored for system calls and shared libraries, as well as for the instructions of a specified application program that utilizes the system calls and shared libraries.

One limitation to both the instruction interpretation and the bounce-back methods is the handling of page faults. When the first interrupt handler determines that reading the next instruction will cause a page fault (i.e., that reading the instruction will require reading in a page from disk), or detects that the interrupted program is in the processing of servicing a page fault, the first interrupt handler sets up the next interrupt and then returns from the first interrupt without further processing.

Other limitations to the instruction interpretation and bounce-back methods are due to artifacts resulting from the processor architecture. For instance, the instruction interpreter may be forced to stop interpreting at certain instructions. In the COMPAQ Alpha processor, certain instructions, such as "PAL calls", are executed atomically and have access to internal registers and instructions that are not available to the interpreter; and therefore cannot be interpreted.

The bounce-back method may fail to interrupt the second time at the "right" point, if the number of system clock cycles between the first and second interrupts is specified, not the number of instructions. Depending on the processor architecture, the same instruction may take different amounts of time to execute, and the second interrupt may not occur at the same point. To compensate for this problem, the user may, based on empirical data from repeated executions of the profiling system, adjust the specified number of clock cycles so that interrupts occur at a desired point in the program. In an alternate embodiment, this adjustment may be adaptively made by the profiling system. In one implementation of adaptive adjustment, if the bounce-back interrupt does not occur at the correct point, it means that no progress was made; i.e., that the same point was interrupted for two consecutive times. The profiling system then increases the specified number of cycles and attempts another bounce-back interrupt. In particular, the profiling system initially sets the number of cycles equal to five for the first bounce-back interrupt. If the profiling system interrupts at the same instruction, another bounce-back interrupt is attempted. If the profiling system interrupts at the same instruction again, the number cycles is increased to seven, and another bounce-back interrupt is attempted. If the profiling system interrupts at the same instruction again, the number of cycles is increased to nine, and another bounce-back interrupt is attempted. If the profiling system again interrupts at the same instruction, the profiling system gives up and does not capture a value sample for this profiling interrupt.

Sampling Correlated Context Values—Tuples

For many types of analyses and for optimization, tuples storing context information along with the values of interest are useful. The tuples can store the values of the destination register, other registers or memory locations. Depending on the embodiment, the first or second interrupt handler stores tuples of data in the first database.

Figure 6:
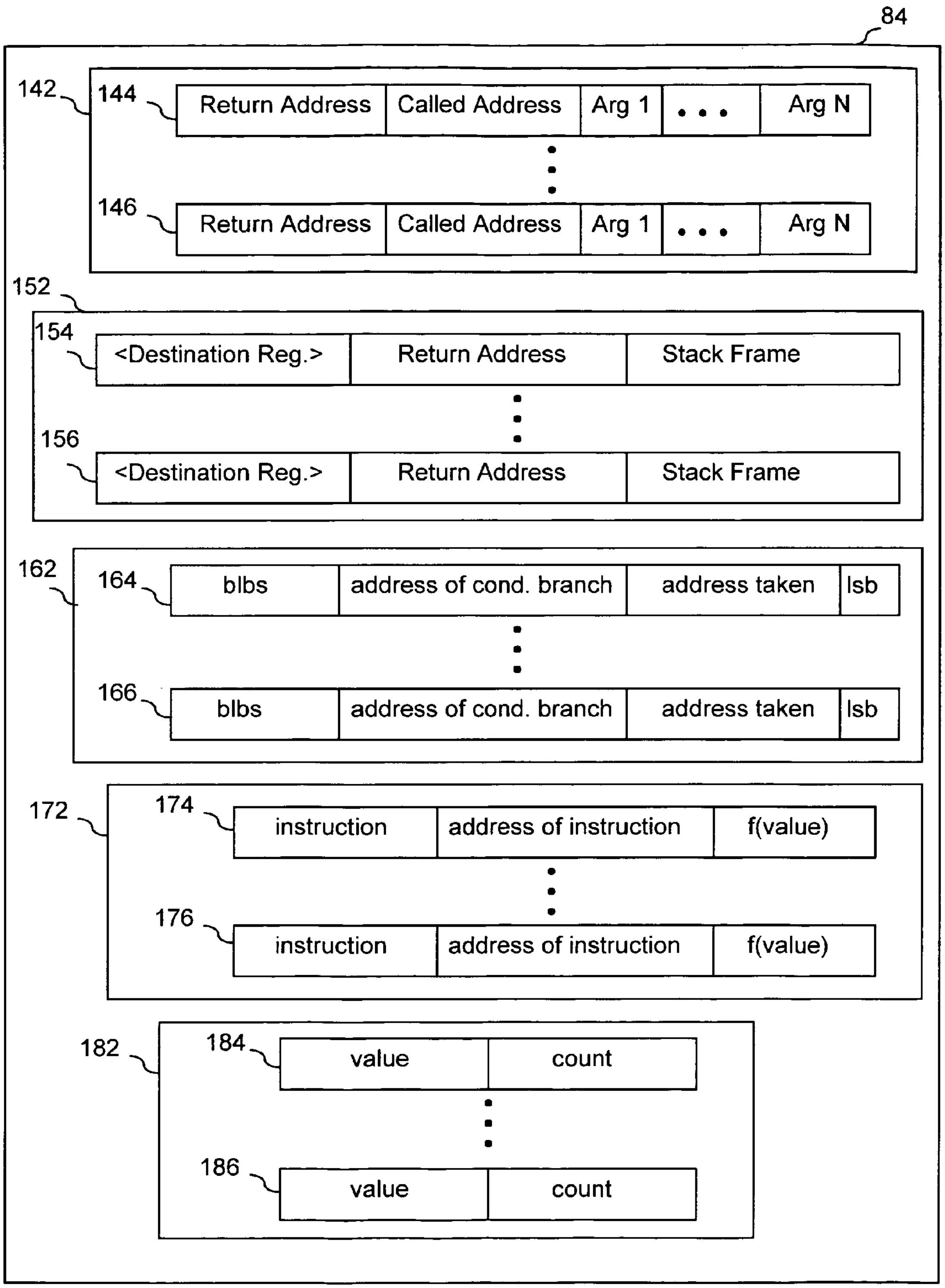
FIG. 6 is a diagram showing various data stored in the first database.

Referring to FIG. 6, many different tuples of values can be stored in the first database. In one set of tuples 142, tuples 144, 146 of correlated values include the return address that identifies the calling context, that is, the call site which invoked the function containing the profiled instruction and the data values of arguments, Arg 1 to Arg N associated with the call site. An argument that is passed to a function may be highly invariant from one call site, but not from another. Similarly, the argument may have different sets of frequently occurring values from different call sites. For instance, for an argument x passed to a square root function (sqrt(x)), a value of x=1 may be used at a first call site sixty percent of the time, while a value of x=16 is used at a second call site seventy percent of the time. The ability to distinguish frequently occurring values based on call site is useful for optimizations such as code specialization of function invocations based on call site. An optimizing compiler can use the above mentioned sampling values, indicating frequency of usage of specific parameter values for each call site, to optimize the corresponding object code.

In another set of tuples 152, the tuples 154, 156 store the return address and the contents of the destination register. The return address is typically found in either a return address register or at the base of the current stack frame, which is pointed to by the stack frame pointer. A stack frame is a data structure that is stored each time that a procedure is called. The stack frame stores parameter values passed to the called procedure, a return address, and other information not relevant to the present discussion. By capturing the return address, the content of the destination register, and possibly other values in the current stack frame as a tuple of values, a table of specific individual call sites can be constructed. In an alternate embodiment, the table is stored in the form of a hotlist.

Additional Values of Interest

As described above, the data values of interest include the contents of registers—the source register, the destination register and the program counter. Other types of values may also be stored including values that represent certain properties of the system. A mechanism allows a user to choose between an open ended set of values that represent properties of a currently executing process, thread of control, processor, memory access instruction set for those processors that have more than one native instruction set, or RAM address space for those processors that can execute instructions out of two or more distinct regions of RAM. For example, in a UNIX operating system, the properties of a currently executing process include:

- processor interrupt priority level (IPL);
- whether the current thread holds certain locks;
- a list of locks held by the current thread;
- identifiers for the current process, parent process, user and group;
- an identifier for the controlling tty;
- privileges and protections such as whether the effective user identifier and the real user identifier are the same;
- signal information, such as whether signals are pending or blocked, in other words, the equivalent of interrupt level in user space;
- scheduling information including thread priority and scheduling policy;
- current physical processor and processor set; and
- physical addresses associated with instructions that access memory.

For instance, capturing the current interrupt priority level (IPL) allows kernel developers to determine whether an executable is remaining at a high interrupt priority level for long periods of time. Capturing scheduling information allows users to determine the number of cycles used to execute "real-time" tasks. Capturing physical addresses for loads and stores provides information about the number and sources of memory references that are remote in a non-uniform memory architecture (NUMA). Capturing the other values and properties listed above can yield useful correlated information for a wide variety of program and machine states.

The instruction interpretation value-capture method also enables the collection of program path information. A program path is a set of object code instructions that are executed consecutively. In particular, since the interpreter interprets the conditional branch instruction, the first_interrupt handler stores the address or direction taken by the conditional branch instruction. The first_interrupt handler stores the conditional branch instruction, the address of the conditional branch instruction, and the address taken by the conditional branch instruction in a set of tuples 162 in the first database. In subsequent compilations, an optimizer uses the values stored in the tuples 164, 166 to optimize the generated object code by improving the quality of the branch predictions and prefetches based on the most frequently taken branch. The optimizer can use predicated instructions, such as a conditional move, to avoid branch mispredictions.

In an alternate embodiment, the first_interrupt handler stores data that identifies the destination of each instruction that can cause transfer of control flow. Such instructions include conditional branches, unconditional branches, jumps, subroutine calls and subroutine returns. In general, destinations are identified by their memory addresses. For conditional branches, the destinations may alternatively be identified by a single taken/not-taken bit. A complete path profile can be stored as a sequence of the destination information for each interpreted control flow instruction using encoding. One encoding technique includes the first interpreted program counter value with a first in-order list storing the taken/not-taken bits for each conditional branch instruction, and with a second in-order list storing the destination addresses for other control flow instructions. In an alternate embodiment, the size of the path information is reduced by storing hash values of the destination addresses rather than the full addresses. In another alternate embodiment, the size of the path information is reduced using a compression technique.

In an alternate embodiment, the number of instructions interpreted per interrupt is adjusted to store program paths having a predetermined path length. In another alternate embodiment, the predetermined program path length is changed during program execution.

In yet another embodiment, the data values in user-mode registers are stored in the first database even when the executing object code instructions are in the kernel. In particular, if the executing object code instruction was a system call, the call site of the system call is stored in the tuple along with the values in the user-mode registers. Therefore, particular system call sites are identified with samples of data values from the kernel, and system calls from one call site in a user application program can be distinguished from system calls from other call sites.

A selection mechanism allows a user to choose the data values to store in the profile database. The selection mechanism is a software program that allows the user to choose the values of interest to be stored, and may be implemented with a graphical user interface.

In another embodiment that will be discussed below, a custom downloadable script allows a user to choose a set of values. Alternately, a command-line interface specifies whether to collect information that identifies the calling context.

Sampling Functions of Values

For some instructions, it may be useful to store functions or projections of the data values of interest, instead of the data values themselves. In general, a function is applied to a data value of interest before the data value of interest is stored; the result of the application of the function to the data value of interest is stored in the first database.

For instance, in one processor, a branch on low bit set (bibs) instruction branches if the least significant bit of its operand is set. A table of values constructed by storing all operands of the bibs instruction may exhibit very little invariance. However, a table of values 162 constructed by storing the least significant bit (Isb) of each operand in the tuples 164, 166 may reveal that the least significant bit is set ninety percent of the time, thereby exhibiting very high invariance. The optimizer can use this high invariance to optimize prefetches of instructions by prefetching the instructions associated with the path of highest invariance.

Other useful functions or projections of values include:

- statistics of data values of interest, such as the mean, minimum, maximum, and variance;
- the sign of the data values of interest, such as positive, negative or zero;
- the alignment of the data values of interest, such as word, quadword or page;
- value bit patterns, such as specified individual bits, specified groups of bits or specified functions of bits; and
- functions, such as sums or differences of correlated values, for example, the offset between two registers containing address values.

Note that the statistics of data values of interest, such as the mean, minimum, maximum, average, and standard deviation and variance may be stored by the interrupt handler in the first database. Alternately, the aggregation daemon stores the statistics of the data values of interest in a hotlist or the profile database. For example, depending on the embodiment, the interrupt handler or the aggregation daemon implements a maximum value function by comparing the old value in a tuple to a new value, and storing the greater of the two values back in the tuple.

More generally, in an exemplary set 172, tuples 174, 176 store the instruction, the address of the instruction and a function of a value in the first database. Alternately, the function may be of a set of values as described above. The functions of values may be stored as separate values or entries in the table.

In another embodiment, an entire table is used as an argument to a function. For example, the average, mean, variance, minimum and maximum values of the table are generated and reported to a user.

The function applied by the first or second interrupt handler to the captured data values may be a histogram function. In the table 182, each tuple 184, 186 is used by the first or second interrupt handler as a bucket with a value and a count. When each value of interest is captured, the corresponding count is updated. The resulting histogram is stored in the profile database or as a separate table and the histogram results are reported to the user. The histogram table 182 is similar to a hotlist, described below.

Custom Downloadable Value-Capture Scripts

The instruction interpretation method allows custom scripts (92, FIG. 1) to be downloaded. Depending on the implementation, the interpreter invokes the value capture script either before, after, or in conjunction with interpreting the instructions.

In one embodiment, the value capture script includes pre-compiled object code that is directly executed without interpretation. In an alternate embodiment, the value capture script itself is expressed in a language that is interpreted.

Figure 7:
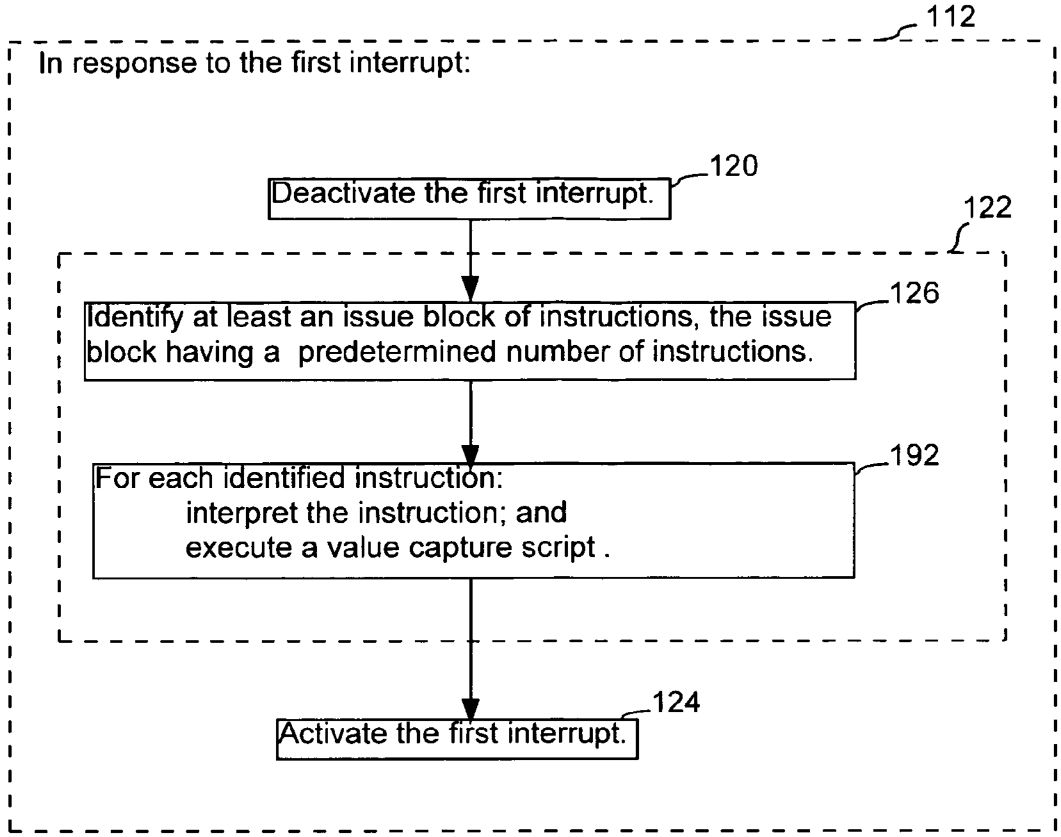
FIG. 7 is a flowchart showing the use of a value capture script.

In FIG. 7, after each instruction is interpreted, the interpreter invokes the script to determine and store values of interest. Steps 120, 126 and 124 are the same as described above and will not be further described. In step 192, each instruction of the issue block is interpreted. After interpreting each instruction, the script is executed to store values of interest in the first database. In this way, the user can control and specify the values of interest to process and store in the first database.

In an alternate embodiment, the script performs additional computations for use during subsequent script invocations. Software fault isolation or interpreted scripting languages are used to ensure safe execution of the scripts. Some exemplary custom scripts include:

- storing the base addresses for load and store instructions instead of the values that are loaded or stored;
- storing values being overwritten, either in registers or in memory, instead of values being stored, to identify redundant load and store instructions;
- storing a bit that indicates whether a new value was different from an overwritten value to identify redundant load and store instructions;
- storing specialized values at key or predetermined addresses in the code;
- forcing the interpreter to produce a "wrong" answer, for instance, for testing purposes to force a program to exercise a slow path rather than a fast path; and
- simulation of selected sequences of operations, focusing on selected aspects of the processor architecture or memory system behavior.

For example, a mutex is an object used to synchronize access by multiple threads to shared data. In one embodiment, the specialized values in a mutex acquire routine are stored to determine how much mutex contention occurs, on which mutexes, and from which call sites.

Note that, in yet another exemplary embodiment, the custom script causes a user- mode trap to be sent to a profiled process so that the profiled process can do its own profiling of code that it is interpreting. This implementation is especially useful when profiling a JAVA program of JAVA bytecodes. The JAVA bytecodes are interpreted by a JAVA virtual machine in the user space. The custom script is executed in the kernel and causes the user-mode trap to be sent to the JAVA program. In response to the user-mode trap, the JAVA Virtual Machine stores JAVA specific data values of interest for the JAVA program in a database in the JAVA Virtual Machine. After responding to the user-mode trap, the script is again executed. This technique is not limited to JAVA, and works on any system that interprets code to execute it.

The technique of having the custom script cause a user-mode trap is also used when the profiled program includes native code instead of code which is interpreted. In one embodiment, a native user-mode program registers a user-mode handler to be executed in response to a user-mode profiling interrupt via an upcall from the kernel to the profiled program.

In an alternate embodiment, user-mode profiling interrupts or upcalls from the kernel to the profiled user mode program are performed without the use of downloadable scripts. For example, a command-line option to the profiling system is specified to cause user-mode profiling interrupts for all or a subset of the profiled applications.

When multiple value capture scripts are used, the interpreter selects a particular value capture script based on the user identifier, the process identifier and the current program counter. In one embodiment, for example, the interrupt handler determines the process identifier of the interrupted program, the current program counter value of the interrupted instruction, the process identifier of the capture script and a range of program counter values of interest associated with the capture script. If the process identifiers of the interrupted program and capture script are the same, and the current program counter value is in the range of program counter values, that capture script is executed.

Security

Figure 8:
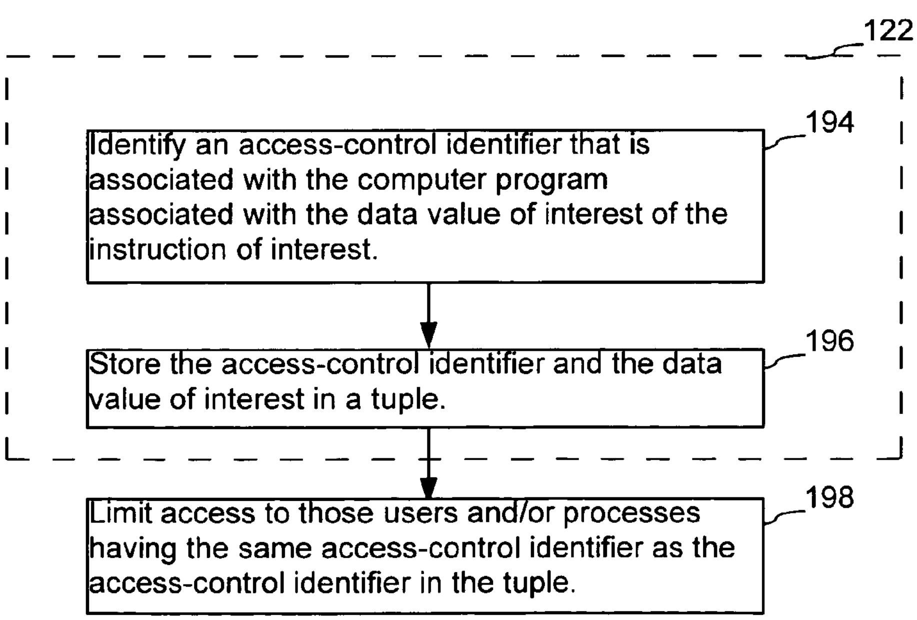
FIG. 8 is a flowchart implementing system security in the present invention.

In another aspect of the invention, the profiling system enforces security and access control policies. In FIG. 8, in the storing step 122 of FIG. 3, an access-control identifier associated with the computer program is identified and associated with the data value of interest of the instruction of interest (194). In step 196, the access-control identifier and the data value of interest are stored in a tuple.

In step 198, access to the program profile data is limited to those users and/or processes having the same or a higher ranking access-control identifier as the access-control identifier in the tuple. One exemplary higher ranking access-control identifier is the system administrator with root privileges to access the entire system. The system administrator can access all the data stored in the profile database. A user can only access the data with his same user identifier and/or group identifier.

In addition to permitting users to access data only from their own processes, in an alternate embodiment, only a very privileged user accesses data collected from the kernel because the kernel may be processing data on behalf of one process in an interrupt routine that interrupts the context of another process.

In one embodiment, the access-control identifier includes at least one of a user identifier, a group identifier, a process identifier, the parent process identifier, the effective user identifier, the effective group identifier and the process group identifier.

Exemplary Reports

The profiling system procedures include a set of predefined profiling commands (94, FIG. 1) that can be executed by a user to generate various type of reports (90, FIG. 1). The exemplary reports described below use assembly code for a COMPAQ Alpha processor executing a "povray" ray tracing application. One exemplary command, dcpivcg, generates and displays a report showing a call graph from the data values of the profile database as follows:

polyeval 61.0% from numchanges (0x12007c194)

polyeval 17.4% from numchanges (0x12007c16c)

polyeval 21.6% from regula_falsa (0x12007c6 cc)

This report shows that the function, numchanges, called another function, polyeval, with the address of the call site in the calling routine of "0x12007c194" for 61.0% of the samples, and with the address of the call site in the calling routine of "0x12007c16c" for 17.4% of the samples. The function, regula_falsa, called the polyeval function with the address of the call site in the calling routine of "0x12007c6 cc" for 21.6% of the samples.

Another command, dcpivargs, generates and displays a report showing potential invariant function arguments for the called functions in the following form as follows: (Name of called function): (largest percentage of samples calling the function with a specified value in argument one, the associated specified value of argument one) (largest percentage of samples calling the function with a specified value in argument two, the associated specified value of argument two) . . . (largest percentage of samples calling the function with a specified value in argument n, the associated specified value of argument n)

An exemplary report is shown below:

| | |
|---|---|
| solve_hit1: | (56.3% 0x11fffd980) (63.6% 0x1400691d0) |
| numchanges: | (65.2% 0x11fffd040) (100.0% 0x4) (4.6% 312500) |
| Attenuate_Light: | (8.3% 0x14006b810) (0.8% 56.9011) |

This report lists the name of each function followed by a list of arguments with the percentage of samples having that argument. The function, solve_hit1, has two arguments. For the first argument, the data value exhibiting the greatest amount of invariance has a value 0x11fffd980 and comprised 56.3% of the samples. For the second argument, the data value exhibiting the greatest amount of invariance has a value of 0x1400691d0 and comprised 63.6% of the samples.

Another exemplary command, dcpivblks, generates and displays a report from the data stored in the profile database that is useful for finding invariant blocks. The report is as follows:

| number of cycles | instruction | value profile |
|---|---|---|
| 63 | ldq a1, 0(a0) | a1: (33.4% 0x2) (27.9% 0x200000002) . . . |
| 542 | sll a1, 0x30, a1 | a1: (100.0% 0x2000000000000) |
| 22 | sra a1, 0x30, a1 | a1: (100.0% 0x2) |

The three assembly language instructions, ldq, sll and sra, form an invariant block. The instructions are executed consecutively. The instruction ldq represents a load instruction that loads the sixty-four bit word addressed by register a0 into register a1. The second instruction, sll, represents a shift left instruction that shifts a1 left by forty-eight bits. The third instruction, sra, represents a shift right that shifts a1 right by forty-eight bits, and sign extends it.

In the first instruction, ldq, register a1 is loaded with different values. Note that after the second instruction, sll, is executed, register a1 always has the same value, 0x2000000000000. After the third instruction, sra, is executed, the contents of register a1 always has a value of two.

Another exemplary command, dcpivlist, generates and displays a report from the data stored in the profile database that outputs the value profile in context. For example, a report for the alignd function in the SPEC 124.m88ksim benchmark executing on a COMPAQ Alpha processor generated the following report:

| number of cycles | instruction | | | v # | value profile |
|---|---|---|---|---|---|
| 4 | 0x..acb8 | bne | t4, 0x..ade4 | 1 | t4: (100.0% 0) |
| 0 | 0x..acbc | ldq_u | zero, 0(sp) | 1 | zr: (100.0% 0x11ffff4ac) |
| 1878 | 0x..acc0 | ldl | t2, 0(a2) | 1 | t2: (100.0% 0) |
| 0 | 0x..acc4 | ldl | a4, 0(t1) | 1 | a4: (100.0% 0) |
| ... | | | | | |
| 1851 | 0x..adc8 | stl | a0, 0(a2) | 1 | a0: (100.0% 0) |
| 1876 | 0x..adcc | ldl | t4, 0(a1) | 1 | t4: (100.0% 0) |
| 3687 | 0x..add0 | zapnot | t4, 0xf, t4 | 1 | t4: (100.0% 0) |
| 1819 | 0x..add4 | srl | t4, 0xf, t4 | 1 | t4: (100.0% 0) |
| 1875 | 0x..add8 | stl | t4, 0(a1) | 1 | t4: (100.0% 0) |
| 0 | 0x..addc | beq | a4, 0x..acc0 | 2 | a4: (99.6% 0) (0.4% 1) |

The variable v# represents the number of values in the value profile or hotlist. In the instruction with v# equal to two, two values, zero and one, are in the associated value profile.

The report below was used to improve the execution time of the buildsturm function in the povray ray tracer. The function differentiated and normalized the following equation:

$2x^2+3x+5 \text{-->} x+3/4$:

```
for (i=1; i<=degree; i++)
  Newc[i-1]=oldc[i]*i/norm;
```

The following report was generated:

| Instruction | | s # | v # | value profile |
|---|---|---|---|---|
| cpys | $f0, $f0, $f11 | 122 | 1 | f11: (100.0% 4) |
| ldt | $f1, 0(t7) | 415 | 16 | f1: (20.5% 1) (0.2% −6.54667) . . . |
| stq | t9, 8(sp) | 416 | 4 | t9: (26.9% 4) (25.7% 1) . . . |
| ldt | $f10, 8(sp) | 425 | 4 | f10: (27.5% 1.97626e−323) . . . |
| cvtqt | $f10, $f10 | 423 | 4 | f10: (26.2% 1) (25.5% 4) . . . |
| mult | $f1, $f10, $f1 | 423 | 16 | f1: (14.7% 4) (0.2% −18.3555) . . . |
| divt | $f1, $f11, $f1 | 404 | 15 | f1: (23.3% 1) (0.2% −3.65508) . . . |

The variable s# is the number of samples associated with the value profile or hotlist. In the example above, the first instruction cpys was sampled 122 times, and the value four was captured in all cases.

Other Uses of Value Profiles

Programmers use value profiles to better understand the behavior of their code. Value profiles can also be exploited to drive both manual and automatic optimizations, including code specialization, software speculation and prefetching.

A value's invariance is the percentage of times that the value appears in the sample. A value is considered to be invariant if always has the same value. Values may also be semi-invariant, that is, have a skewed distribution of values with a small number of frequently occurring values.

Figure 9:
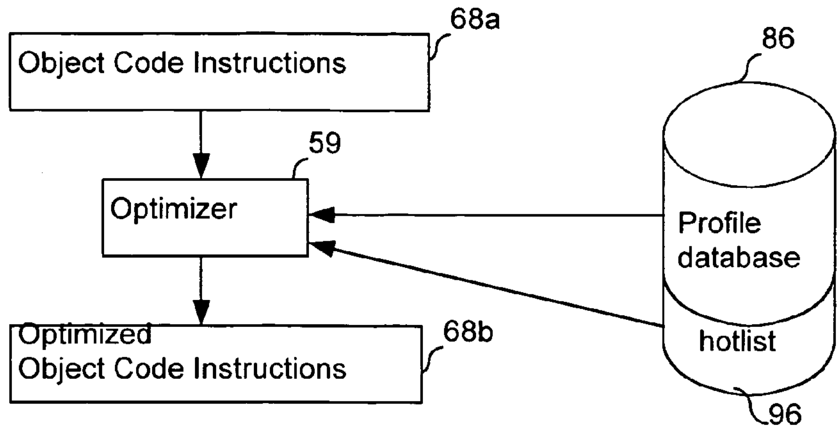
FIG. 9 is a diagram of generating optimized object code instructions.

In FIG. 9, object code instructions 68*a* are supplied to the optimizer 59. As shown in FIG. 1, the optimizer 59 is part of the compiler and may be invoked as an option such as "cc -O source.c." Prior to executing the optimizer 59, the code was already compiled, loaded and executed. The profiling system was invoked to store values of interest in the codes in a profile database 86. In an alternate embodiment, the profiling system caused data values of interest to be stored in a hotlist 96. The optimizer 59 receives the object code instructions 68*a* and uses the information in the profile database 86 and hotlist 96 to optimize the program to generate optimized object code instructions 68*b*.

In an alternate embodiment, the optimizer 59 is separate from the compiler and operates directly on compiled binaries without source code.

For code specialization, when the dynamic values of variables in a routine or a basic block exhibit a high degree of invariance, the optimizer 59 generates separate specialized versions of the code 68*b*. Within a specialized portion of code, optimizations such as constant folding/propagation and strength reduction are performed. The use of context information improves this type of optimization by allowing code to be further specialized based on call site.

For software speculation, the inputs to some computations may involve high-latency loads from memory, or expensive computations. Instead of waiting for the high-latency loads or computations to complete, the optimizer 59 generates object code that starts subsequent computations using the expected values of semi-invariant input values. The optimizer 59 also generates code 68*b* that verifies the result of the speculative computation once the actual input value is available. If the actual input value was predicted incorrectly, the code 68*b* generated by the optimizer 59 discards the results of the computation. If the actual input value was predicted correctly, the code 68*b* generated by the optimizer 59 improves the execution time of the computation because the computations were started earlier than would otherwise occur. In an alternative embodiment, in a multithreaded processor architecture, the optimizer 59 generates code 68*b* that starts a new thread to perform the speculation.

For prefetching, the optimizer 59 identifies highly-invariant addresses for load instructions and generates code 68*b* that initiates a prefetch of data at those highly-invariant addresses into the cache, thereby decreasing the latency experienced by the load instruction when the address is predicted correctly. Using additional context information, the optimizer 59 generates code 68*b* that initiates a prefetch of data based on highly invariant offsets between data values containing addresses.

The optimizer 59 also identifies which mutexes are suffering from contention using the value profiles. A programmer can use the value profile to fix contention problems.

In another embodiment, the value profile identifies the interrupt level at which each portion of code is being executed. Kernel programmers can use this information to focus optimization or debugging efforts on the portions of code identified as running at high interrupt levels.

The Hotlist

Figure 10:
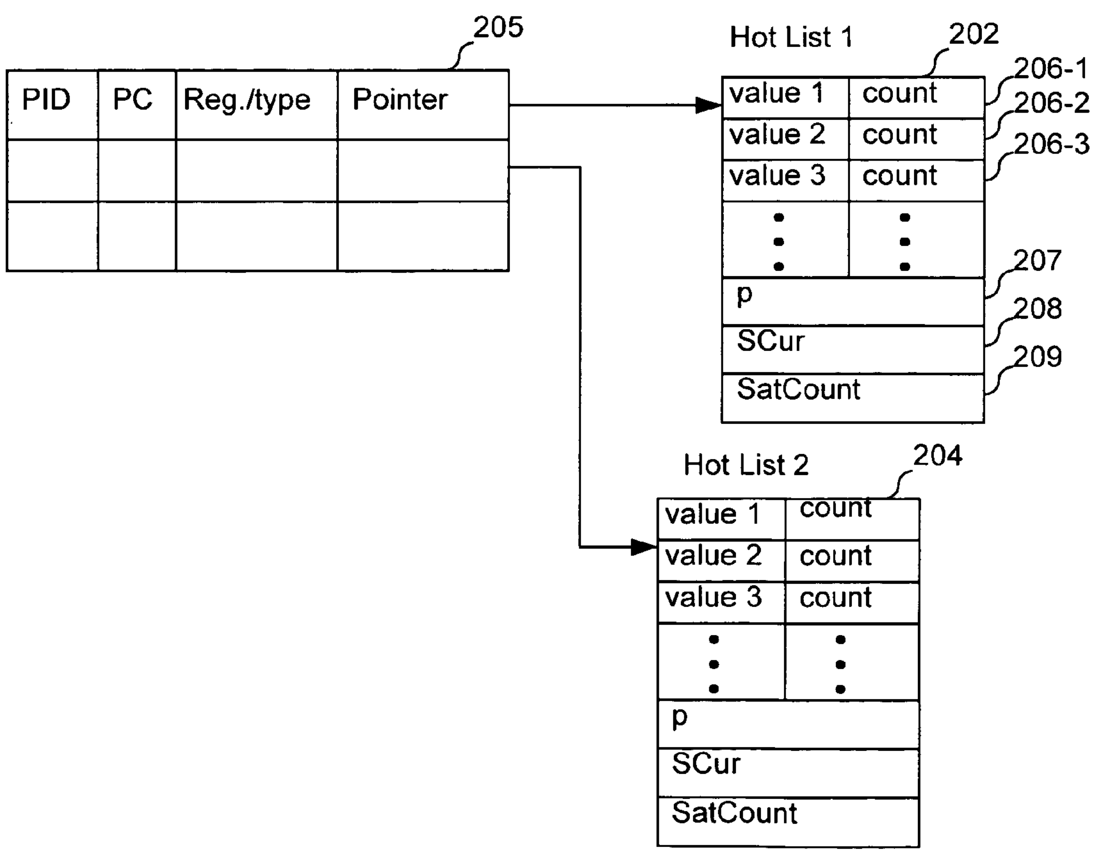
FIG. 10 is a diagram of exemplary hotlists.

A hotlist is used to store information about frequently-occurring values and their relative frequencies. In FIG. 10, exemplary hotlists 202, 204 are shown. The hotlists 202 and 204, Hot List 1 and Hot List 2, respectively, are specialized tables that each store at least one tuple. When the value being sampled is not invariant, there will generally be two or more tuples in the corresponding hotlist.

Each tuple has a value and an associated count. For simplicity, only hot list 1, 202, will be described. Generally, a separate hotlist 202 is maintained for each instruction for which a parameter is being profiled. If more than one parameter is being profiled for an instruction, and information about the invariance of the correlated parameters is desired (e.g., a register value together with the corresponding call site), a single hotlist can be maintained where each "value" is a tuple of the correlated data values. Alternately, if more than one parameter is being profiled for an instruction, and those parameters are considered to be independent of each other, a separate hotlist 202 may be maintained for each parameter that is being profiled.

One goal of using a hotlist 202 is to maintain a list of frequently occurring values. The hotlist 202 has a predetermined size, and preferably, is sufficiently small to remain in main memory during program execution. The hotlist 202 stores a maximum predetermined number (N) of tuples 206. The tuples 206 in the hotlist 202 are updated statistically to store the most frequently occurring data values. Multiple hot lists 202, 204 may be created and updated for the data values for different instructions of interest.

Each hotlist 202 also includes supplemental fields 207, 208, 209, which are used by the update_hotlist procedure. In particular, a probability value p 207 is used to indicate the percentage of value samples that are actually represented by entries in the hotlist. The probability value p also indicates the probability that a new value sample will be stored or counted in the hotlist 202.

A sequence value, Scur 208, is used to keep track of the total number of values received by the update_hotlist procedure for this particular hotlist. The current sequence value Scur is similar to a timestamp in that it corresponds to the time at which the current value sample was generated.

SatCount 209 is used as a saturating counter that is incremented when a sample value is found in the hotlist table, and is decremented when a sample value is not found in the table. The SatCount value for a particular hotlist is used to choose between two different methods for updating the hotlist. As described below, the "concise samples" technique is used when most sample values are found in the hotlist table, while the "counting samples" technique is used when most sample values are not found in the hotlist table. The update_hotlist procedure switches to the concise samples technique when SatCount reaches a predefined maximum value (MaxEnd), and switches to the counting samples technique when SatCount reaches a predefined minimum value (MinEnd). The hysteresis introduced by converting the table updating technique at the endpoints of the SatCount range avoids frequent flipping back and forth between the two techniques.

In an alternate embodiment, the hotlist 202 stores a tuple having both the data value and the count when the count is greater than one, and stores only the data value as a singleton when the count is equal to one.

An indexing table 205, associates a process identifier (PID), program counter value, and type of instruction with a particular hot list 202, 204 using the pointer. In an alternate embodiment, the indexing table 205 associates any of the PID, user identifier, group identifier, effective user identifier, effective group identifier, parent process identifier and parent group identifier with the hotlist 202, 204.

Methods for Maintaining Value Hotlists

In the preferred embodiment, value profiling is performed for each instruction parameter of interest using a fixed-size hotlist, having room for N tuples. When necessary, the tuple representing a least-frequently used value is evicted from the hotlist to make room for a tuple representing a new value.

Depending on the implementation, the first_interrupt handler or the second interrupt handler calls an update_hotlist procedure (98, FIG. 1) to store and update the values in the hot list (96, FIG. 1). In the embodiment shown two different techniques are used to update the hotlist: a "concise samples" technique (see FIG. 11B) and a "counting samples" technique (see FIG. 11A). Both techniques use probabilistic counting schemes. As a result, some value samples received by the update_hotlist procedure are not included in the hotlist or are not counted.

The concise samples and counting samples methods were described by P. B. Gibbons and Y. Matias, in "New Sampling-Based Summary Statistics for Improving Approximate Query Answers," Proceedings of the ACM SIGMOD International Conference on management of data, 2–4 Jun. 1998, Seattle, Wash., pp. 331–342. The concise samples and counting samples methods have been used to provide fast, approximate answers to queries in large data recording and warehousing environments. The present invention uses these methods in a different context—to create and maintain small hotlists of data values in the first database. In a preferred embodiment, the counting samples technique is modified to further improve its efficiency.

In both the concise samples and counting samples methods, the input is a sequence of data values that are generated by a given instruction each time that instruction is interpreted by the interrupt routine. The arrival of data value V at the input of the update_hotlist procedure is called a V-event. A tuple has a value and an associated count, which is represented as (value, count). A tuple (V, C) denotes a count of C V-events. A "hotlist" includes up to N tuples and has an associated probability p. A value V is said to be in the hotlist if a tuple (V, C) is in the hotlist for some count C that is greater than zero. If a tuple (V, C) is in the hotlist, it is the only tuple in the hotlist with the value V.

Figure 11A:
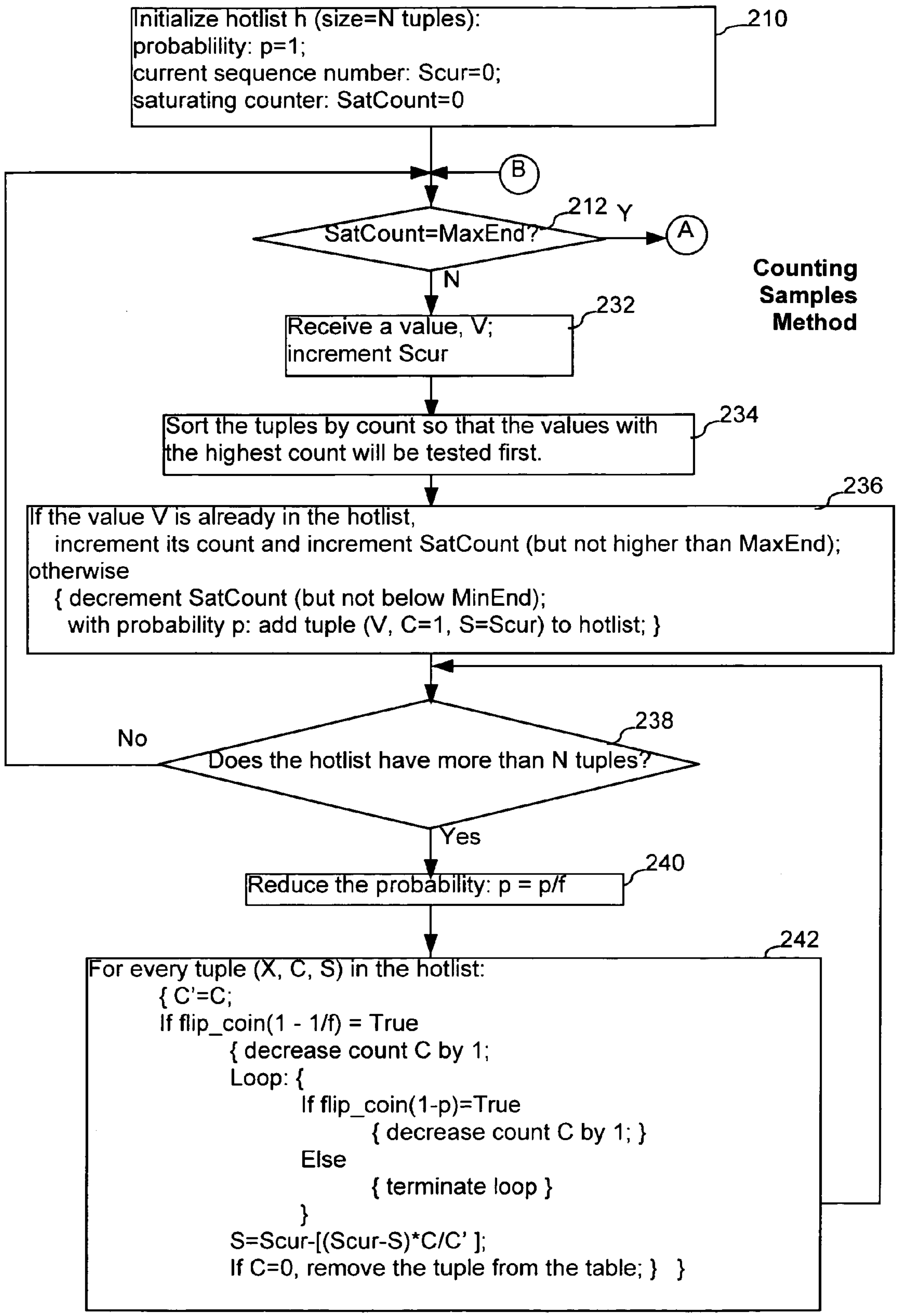
FIGS. 11A and 11B are flowcharts of a method of updating the hotlist using counting samples and concise samples.
Figure 11B:
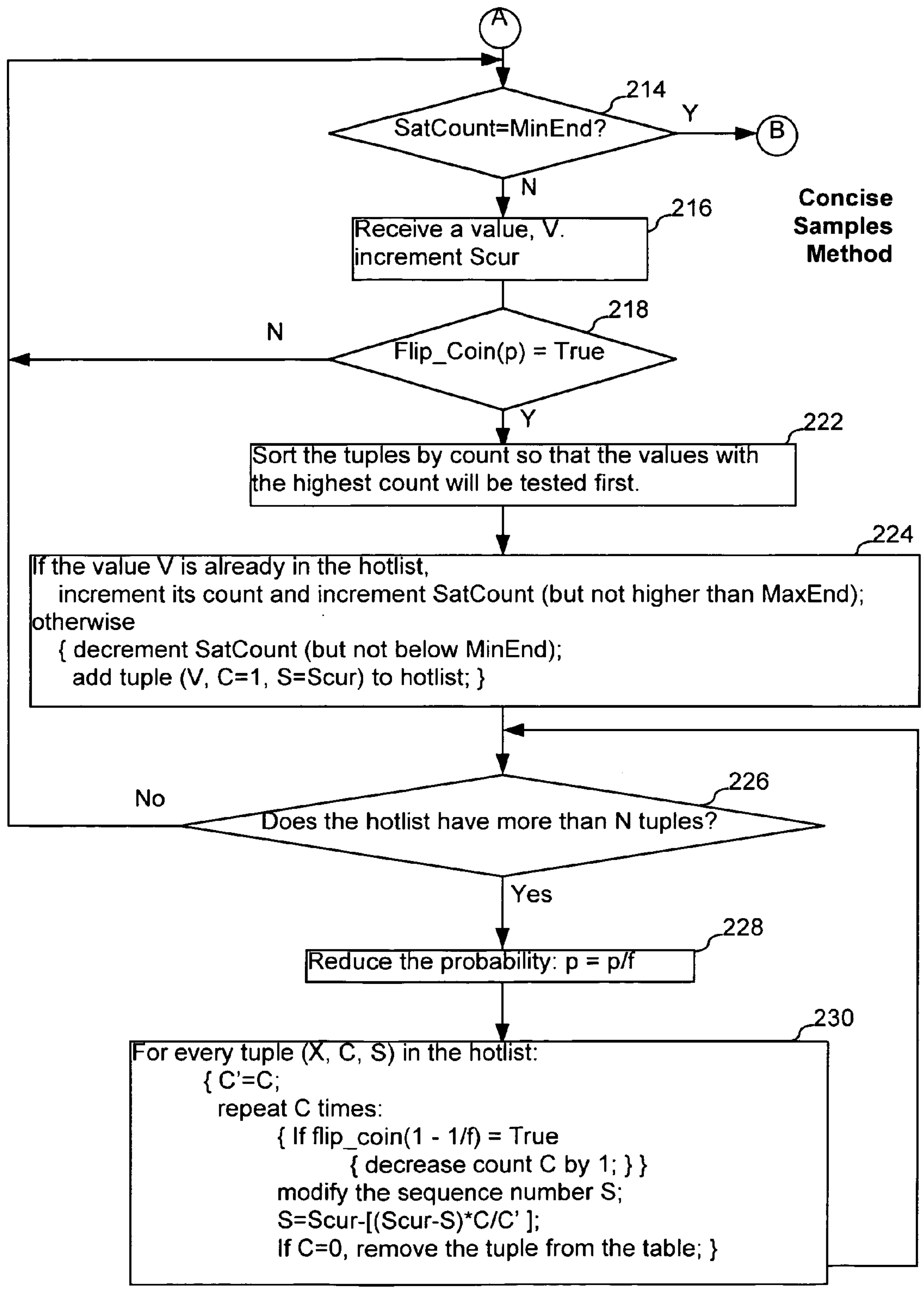

FIGS. 11A and 11B are flowcharts of one embodiment of the update_hotlist procedure (98, FIG. 1). Initially (step 210), the hotlist has no tuples, the probability, p, for the hotlist is set equal to one and the SatCount is set equal to zero (which is the MinEnd value). The size of the hotlist is fixed to equal N.

In the embodiment described next, each tuple in the hotlist is expanded to include an estimated sequence number, S, in addition to a value and count. The estimated sequence number stored in the tuples (V, C, S) can be used to determine if the frequency of a particular sample value is increasing or decreasing over time. In addition, the sequence number values can also be used to help determine which tuples to evict when the hotlist is full. For example, for a tuple with a count of one, if the current value of the sequence number (Scur) divided by two (i.e., Scur/2) is significantly larger than the sequence number of that tuple S divided by the probability p (i.e., S/p), then that tuple represents an "old" sample that has not been repeated, and thus is a good candidate for eviction from the hotlist.

In step 212, if the saturation counter value, SatCount, is equal to MaxEnd the process proceeds to A in FIG. 11B at step 214 to update the hotlist using the concise samples technique. Initially, when the saturation counter value is equal to zero, the process will update the hotlist using the counting samples method. For simplicity, the concise samples method shown in FIG. 11B will be described first.

Concise Samples

Conceptually, in the concise samples method, each data value is counted in the hotlist with a probability p. If a tuple (V, C, S) is in the hotlist, an estimate of the number of data values having a value of V observed is equal to the count C divided by the probability p (C/p).

In FIG. 11B, in step 214, if the saturation counter value, SatCount, is equal to MinEnd, the process proceeds to B in FIG. 11A to process the hotlist using counting samples. In this way, the method can alternate between the concise and counting samples methods. Typical values for MinEnd and MaxEnd are 0 and 50, respectively.

The update_hotlist procedure calls the concise samples procedure (100, FIG. 1) which implements steps 216–230. In step 216, a data value is received. In step 218, a flip_coin procedure (104, FIG. 1) is used to determine whether a value is stored or counted in the database. The flip coin procedure simulates the flipping of an unfair coin that is weighted using the specified probability, p. More specifically, the flip_coin procedure returns a value of True with a probability of p, and returns a value of False with a probability of 1-p.

If the flip_coin procedure returns a False value (218-N), the received data value is not included in the hotlist and the method proceeds to step 214. Otherwise (218-Y), the received sample value is processed. In particular, the tuples in the hotlist are sorted, if necessary, so that the values with the highest count will be tested first (222). However, in most instances the tuples will already be in sorted order. In step 224, the concise_samples procedure determines whether there is already a tuple for data value V in the hotlist, and, if so, increments its count by one and increments the saturation counter, SatCount, by one (but not higher than MaxEnd). If hotlist does not have a tuple for value V, a tuple for value V is added to the hotlist as (V, C=1, S=Scur), and the saturation counter, SatCount, is decremented (but not below MinEnd). The new tuple is added to the hotlist, even if the size of the hotlist exceeds its normal maximum size N.

In step 226, if the hotlist has more tuples than the maximum allowable number of tuples (i.e., N+1 tuples), step 228 decreases the probability p by a factor f (i.e., p=p/f), where f is greater than one. Factor f is typically set equal to N/(N−1), where N is the maximum number of tuples in the hotlist. Thus, if N is equal to sixteen, f would be set equal to 16/15, which are the values used in a preferred embodiment.

In step 230, for every tuple (X, C, S) in the hotlist, the procedure considers "evicting" each X-event represented by count C from the hotlist, with each X-event eviction having a probability of 1−1/f. In particular, the flip_coin procedure is called C times, with an argument of 1−1/f. Each time it returns a True value, the count C of the tuple is reduced by 1. If the resulting count value is zero, the tuple is removed from the hotlist table. If the tuple is not removed, its sequence number S is adjusted to indicate a new pseudo first sequence number having value V. In particular, the S parameter of the tuple is set equal to S=Scur−[(Scur−S)*C'/C], where C' is the count value for the tuple before step 230 was performed, and C is the adjusted count value for the tuple.

For example, for a tuple (1,3,S) with a data value of one and a count of three, the flip_coin procedure is called three times, once for each time that the data value of one occurred. The number of times that the count will be decreased is the number of times that the flip_coin procedure returns a True value.

After performing the data "eviction" step 230, step 226 is repeated. In step 226, if the hotlist has N or fewer tuples, the sample handling process repeats at step 214. On the other hand, if the hotlist still has N+1 tuples, the probability reduction and eviction steps 228, 230 are repeated.

Counting Samples

Conceptually, using counting samples, each data value is counted if either the same data value has already been counted or the flip_coin procedure returns a true value. Furthermore, the probability p of adding a new tuple to the hotlist is repeatedly lowered until only N tuples are needed to store sampled data values in the hotlist.

Referring to FIG. 11B, when the saturation counter, SatCount, reaches MaxEnd, the process proceeds to entry point B of FIG. 11A. In step 212, if the saturation counter, SatCount, is not equal to MinEnd, the counting samples procedure (102, FIG. 1) is called. Steps 232 and 234 are the same as steps 216, 222, respectively, and will not be described.

In step 236, if the data value V is stored in the hotlist, the counting samples procedure increments the count associated with the data value by one, and increments the saturation counter, SatCount, by one. Otherwise, if the data value V is not stored in the hotlist, the counting samples procedure calls the flip_coin procedure with probability p, to determine whether the data value will be added to the hotlist. If the flip_coin procedure returns a True value, the counting samples procedure adds the data value V to the hotlist by including another tuple (V, C=1, S=Scur), even if adding the tuple causes the hotlist to have N+1 tuples.

In step 238, if the hotlist has N+1 tuples, step 240 reduces the probability p by a factor of f, where f is greater than one. For each tuple (X, C, S) in the hotlist, the flip_coin procedure is called with probability parameter of 1−1/f. If the flip_coin procedure returns a True value, the tuple's count is reduced by one. Furthermore, the flip_coin procedure is repeatedly called, with a probability parameter of 1−*p*, until it returns a F*alse value*. F*or* each T*rue* value returned by the flip_coin procedure, the tuple's count is reduced by one, but the count value is not decreased below zero. If the tuple's count is reduced to a value of zero, the tuple is removed from the hotlist. Otherwise the sequence number S of the tuple is modified such that S is equal to Scur−[(Scur−S)*C/C'], where C' is the count value for the tuple before step 230 was performed, and C is the adjusted count value for the tuple. The method then proceeds to step 238 (described above).

For each tuple (V, C, S) in the hotlist, an estimate of the total number of occurrences of the data value V is represented by the following equation:

$$(1/p)+C-1.$$

In FIGS. 11A and 11B, the hotlist stores tuples (V, C, S), where S is an estimated sequence number for the first sample having the value V. When a new data value is added to the hotlist, the triple (V, 1, Scur) is used, where Scur is the sequence number of the input value that caused the triple to be added. When the count is increased, the estimated sequence number remains unchanged. However, when the probability p is reduced, if the count in the triple (V, C, S) is reduced from C to C', then the estimated sequence number S is changed to Scur−(Scur−S)*C/C'. This estimates the sequence number of the first count included in the new count value C for the tuple, assuming the probability of value V appearing in the input is independent of Scur. Compared to the concise samples method, the counting samples method increases the number of cache misses because the hotlist is accessed for every received data sample. Using concise samples, the hotlist is not accessed for every data sample, but is accessed with probability p, thereby reducing the number of cache misses.

An advantage of the counting samples method is that it is not necessary to calculate a random number when the value of a data sample is already represented by a tuple in the hotlist. Another advantage of the counting samples method is that the counts tend to be larger, which makes the count values in the hotlist more accurate indicators of value frequencies than the count values generated by the concise samples method.

In an alternate embodiment, just one of the sampling methods (either counting samples method, or the concise samples method) are used, instead of using both.

Cache Optimization

To efficiently implement the methods of counting samples and concise samples, particularly with respect to cache performance of counting samples, and to improve the performance of the cache, the tuples in the hotlist were sorted by count so that the most common values will be tested first when looking for a match. This is advantageous when there are a few, very common values.

In another approach, the data in the hotlist are reordered so that the data values in the hotlist are stored in contiguous memory locations (e.g., at the beginning of the hotlist table), or some portion (e.g. the first sixteen bits) of the data values are stored in contiguous memory locations, to reduce the range of memory locations that need to be accessed to determine that a sample value does not appear in the hotlist. Reducing the range of memory locations to be accessed inherently reduces cache misses. This method of organizing the hotlist table is most efficient when there are no very common values.

Example Using Concise Samples

The following is an example of the concise samples method showing the input values and the count. The input stream of data values are:

0 1 0 2 0 1 0 3 0 1 0 2 0 1 0 4 0 1 0 2 0 1 0 3 0 1 0 2 0 1 0 5

The maximum number, N, of data values stored in the hotlist is equal to three and the factor f was set equal to eight divided by seven (8/7).

Table 1 below shows the input data value in the first column. The resulting hotlist is in [brackets] in the center column. The value of the probability p is in the third column. When the hotlist has more than N (3) entries, the method is executing steps 228 and 230 of FIG. 11B, reducing the probability p. Initially, as shown in the first row of table one, the hotlist is empty, and the probability is equal to one.

TABLE 1

Example of concise samples

| Data Value | Hotlist | Probability p |
|---|---|---|
| | [ ] | 1 |
| 0 | [(0, 1)] | 1 |
| 1 | [(0, 1), (1, 1)] | 1 |
| 0 | [(0,2), (1, 1)] | 1 |
| 2 | [(0, 2), (1, 1), (2, 1)] | 1 |
| 0 | [(0, 3), (1, 1), (2, 1)] | 1 |
| 1 | [(0, 3), (1, 2), (2, 1)] | 1 |
| 0 | [(0, 4), (1, 2), (2, 1)] | 1 |
| 3 | [(0, 4), (1, 2), (2, 1), (3, 1)] | 1 |
| | [(0, 4), (1, 2), (2, 1), (3, 1)] | 0.875 |
| | [(0, 3), (1, 2), (2, 1), (3, 1)] | 0.765625 |
| | [(0, 3), (1, 1), (3, 1)] | 0.66992188 |
| 0 | [(0, 4), (1, 1), (3, 1)] | 0.66992188 |
| 1 | [(0, 4), (1, 2), (3, 1)] | 0.66992188 |
| 0 | [(0, 5), (1, 2), (3, 1)] | 0.66992188 |
| 2 | [(0, 5), (1, 2), (3, 1), (2, 1)] | 0.66992188 |
| | [(0, 5), (1, 2), (3, 1), (2, 1)] | 0.58618164 |
| | [(0, 5), (1, 2), (3, 1), (2, 1)] | 0.51290894 |
| | [(0, 4), (1, 2), (3, 1)] | 0.44879532 |
| 0 | [(0, 4), (1, 2), (3, 1)] | 0.44879532 |
| 1 | [(0, 4), (1, 2), (3, 1)] | 0.44879532 |

TABLE 1-continued

Example of concise samples

| Data Value | Hotlist | Probability p |
|---|---|---|
| 0 | [(0, 4), (1, 2), (3, 1)] | 0.44879532 |
| 4 | [(0, 4), (1, 2), (3, 1)] | 0.44879532 |
| 0 | [(0, 4), (1, 2), (3, 1)] | 0.44879532 |
| 1 | [(0, 4), (1, 2), (3, 1)] | 0.44879532 |
| 0 | [(0, 5), (1, 2), (3, 1)] | 0.44879532 |
| 2 | [(0, 5), (1, 2), (3, 1), (2, 1)] | 0.44879532 |
| | [(0, 5), (1, 2)] | 0.3926959 |
| 0 | [(0, 5), (1, 2)] | 0.3926959 |
| 1 | [(0, 5), (1, 3)] | 0.3926959 |
| 0 | [(0, 6), (1, 3)] | 0.3926959 |
| 3 | [(0, 6), (1, 3), (3, 1)] | 0.3926959 |
| 0 | [(0, 6), (1, 3), (3, 1)] | 0.3926959 |
| 1 | [(0, 6), (1, 4), (3, 1)] | 0.3926959 |
| 0 | [(0, 6), (1, 4), (3, 1)] | 0.3926959 |
| 2 | [(0, 6), (1, 4), (3, 1)] | 0.3926959 |
| 0 | [(0, 7), (1, 4), (3, 1)] | 0.3926959 |
| 1 | [(0, 7), (1, 4), (3, 1)] | 0.3926959 |
| 0 | [(0, 8), (1, 4), (3, 1)] | 0.3926959 |
| 5 | [(0, 8), (1, 4), (3, 1)] | 0.3926959 |

In this example, the most common three data values were estimated to be zero, one and three. Since the method is probabilistic, estimates of low frequency values may be poor. The estimate of the number of occurrences of zero is 8/0.39 or about twenty. For the value one, the estimate is about ten. For the value three, the estimate of the number of occurrences is about two to three. The actual number of occurrences for the data values of zero, one and three are fifteen, eight and two, respectively.

Example Using Counting Samples

The following is an example using the counting samples method with the same input sequence of data values as for the concise samples above. The input data values are:

0 1 0 2 0 1 0 3 0 1 0 2 0 1 0 4 0 1 0 2 0 1 0 3 0 1 0 2 1 0 5.

As in the example above, the number of tuples in the hotlist, N, is equal to three, and the factor f is equal to eight divided by seven (8/7).

Table two below shows the input data values on the leftmost or first column. The resulting hotlist is in [brackets] in the center column. The value of the probability p is in the third column. When the hotlist has more than N (3) tuples, the method is executing steps 240 and 242 of FIG. 11A, reducing the probability p. Initially, as shown in the first row, the hotlist is empty, and the probability p is equal to one.

TABLE 2

Example of counting samples

| Data Value | Hotlist | Probability p |
|---|---|---|
| | [ ] | 1 |
| 0 | [(0, 1)] | 1 |
| 1 | [(0, 1), (1, 1)] | 1 |
| 0 | [(0, 2), (1, 1)] | 1 |
| 2 | [(0, 2), (1, 1), (2, 1)] | 1 |
| 0 | [(0, 3), (1, 1), (2, 1)] | 1 |
| 1 | [(0, 3), (1, 2), (2, 1)] | 1 |
| 0 | [(0, 4), (1, 2), (2, 1)] | 1 |
| 3 | [(0, 4), (1, 2), (2, 1), (3, 1)] | 1 |
| | [(0, 3), (1, 1)] | 0.875 |
| 0 | [(0, 4), (1, 1)] | 0.875 |

TABLE 2-continued

Example of counting samples

| Data Value | Hotlist | Probability p |
|---|---|---|
| 1 | [(0, 4), (1, 2)] | 0.875 |
| 0 | [(0, 5), (1, 2)] | 0.875 |
| 2 | [(0, 5), (1, 2)] | 0.875 |
| 0 | [(0, 6), (1, 2)] | 0.875 |
| 1 | [(0, 6), (1, 3)] | 0.875 |
| 0 | [(0, 7), (1, 3)] | 0.875 |
| 4 | [(0, 7), (1, 3), (4, 1)] | 0.875 |
| 0 | [(0, 8), (1, 3), (4, 1)] | 0.875 |
| 1 | [(0, 8), (1, 4), (4, 1)] | 0.875 |
| 0 | [(0, 9), (1, 4), (4, 1)] | 0.875 |
| 2 | [(0, 9), (1, 4), (4, 1)] | 0.875 |
| 0 | [(0, 10), (1, 4), (4, 1)] | 0.875 |
| 1 | [(0, 10), (1, 5), (4, 1)] | 0.875 |
| 0 | [(0, 11), (1, 5), (4, 1)] | 0.875 |
| 3 | [(0, 11), (1, 5), (4, 1), (3, 1)] | 0.875 |
| | [(0, 10), (1, 4)] | 0.765625 |
| 0 | [(0, 11), (1, 4)] | 0.765625 |
| 1 | [(0, 11), (1, 5)] | 0.765625 |
| 0 | [(0, 12), (1, 5)] | 0.765625 |
| 2 | [(0, 12), (1, 5), (2, 1)] | 0.765625 |
| 0 | [(0, 13), (1, 5), (2, 1)] | 0.765625 |
| 1 | [(0, 13), (1, 6), (2, 1)] | 0.765625 |
| 0 | [(0, 14), (1, 6), (2, 1)] | 0.765625 |
| 5 | [(0, 14), (1, 6), (2, 1), (5, 1)] | 0.765625 |
| | [(0, 11), (1, 4)] | 0.66992188 |

Using counting samples, the estimated most common values were zero and one. Unlike the resulting hotlist in the concise samples, the hotlist maintained by the counting samples did not result in a third value. The estimate of the number of occurrences of the value zero is equal to 1/0.67+11−1 or approximately 11.5. For the value one, the estimate of the number of occurrences is equal to 1/0.67+4−1 or approximately 4.5. The actual values are fifteen and eight.

Note that the methods are probabilistic; therefore, the decision making may appear to be inconsistent. If the same method were repeatedly applied to the same data with the same parameters, the flip_coin procedure may return different results and the resulting values in the hotlist may appear differently. For example, the counts would be different, or some values would not appear in the hotlist, while other values would appear in the hotlist.

In general, the factor f can be any value exceeding one. Moreover, the factor f does not have to be the same all the time. The factor f can be changed before adjusting the probability p and the method will still be correct. However, when using the factor f, the goal is to remove as few data values as possible from the hotlist while reducing the size of the hotlist to N tuples, and to avoid iteratively reducing the probability p. If the factor f is too large, too many data values will be removed and precision will be lost in the results. If the factor f is too close to one, the method does not remove enough data values, and the process iterates which uses additional processor time.

One preferred value for the factor f is N/(N−1) because that value tends to remove one tuple, although it is probabilistic. In a preferred embodiment, the hotlist stores sixteen tuples, N is equal to sixteen and the factor f is equal to sixteen divided by fifteen (16/15).

Latency Sampling

Interrupt-driven value profiling is also used to collect instruction latency data. In the instruction interpretation method, described above, when the interpreter encounters a particular instruction of interest, the interpreter executes additional instructions to record a pre-access time before executing the instruction, and a post-access time after executing the instruction. The interpreter determines the latency based on the difference of the post-access time and the pre-access time.

In a particular embodiment, the present invention measures the latency of instructions that have a variable execution time. For example, some processors have shift, multiply and divide instructions that have a variable execution time depending on the operand values. Memory access instructions also have a variable execution time.

In one embodiment, the latency of the memory access instructions, such as load or store instructions, is measured. The latency of memory access instructions is referred to as memory latency. When the interpreter encounters a load or store instruction, the interpreter executes additional instructions to record a pre-access time before executing the memory access instruction, and a post-access time after executing the memory access instruction. The interpreter determines the memory latency based on the difference of the post-access time and the pre-access time.

Figure 12:
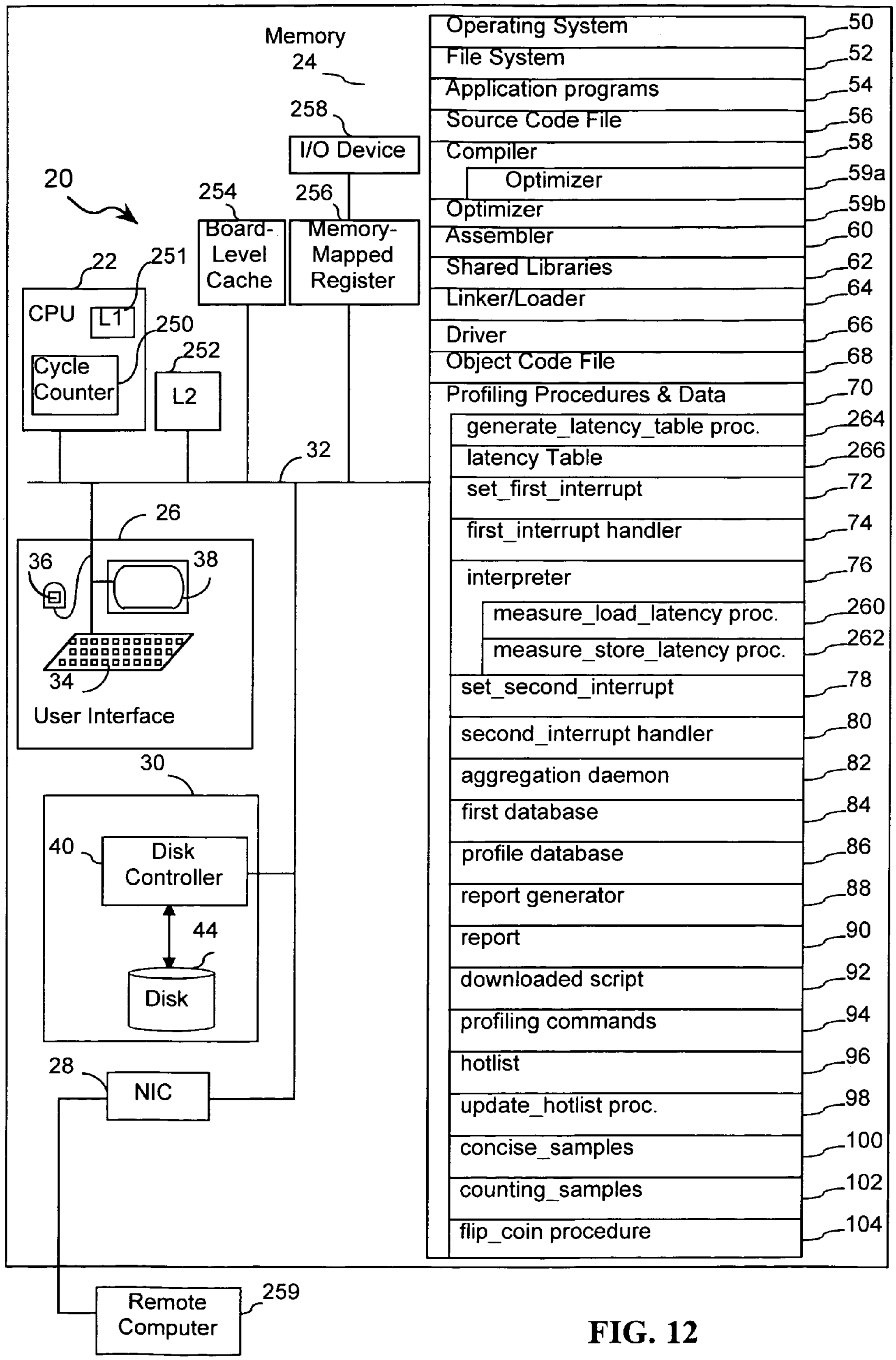
FIG. 12 is a diagram of a computer system, including a memory hierarchy, using latency sampling in accordance with an embodiment of the present invention.

FIG. 12 is a diagram of a computer system using latency sampling in accordance with an embodiment of the present invention. FIG. 12 is similar to FIG. 1; therefore, the differences will be described. In FIG. 12, the CPU 22 includes a cycle counter 250 which counts the number of cycles. FIG. 12 also has a memory hierarchy that includes a first level (L1) cache 251 on the CPU 22, a second level (L2) cache 252, a board-level cache 254 and the memory 24. In one embodiment, the memory 24 includes semiconductor memory such as dynamic random access memory. The access time of the L1 cache 251 is less than the access time of the L2 cache 252 which is less than the access time of the board-level cache 254 which is less than the access time of the memory 24. The L2 cache 252 and board-level cache 254 are coupled to the CPU 22 via the bus 32. One or more memory-mapped registers 256 are also connected to the CPU 22 via the bus 32. The memory-mapped register 256 connects to an I/O device 258. In an alternate embodiment, the memory-mapped register 256 is part of the memory hierarchy. In another embodiment, the access time of the memory-mapped register 256 is greater than the access time of the memory 24.

The network interface card (NIC) 28 connects the computer system 26 to a remote computer 259. In one embodiment, the computer system 259 has the same architecture as the computer system 20. In another alternate embodiment, because the computer system 20 can access data on the computer system 259 via the network interface card 28, the computer system 259 is part of the memory hierarchy.

In the memory 24, the interpreter 76 includes:

- a measure_load_latency procedure (proc.) 260 that measures the memory latency of load instructions in accordance with an embodiment of the present invention;
- a measure_store_latency procedure 262 that measures the memory latency of store instructions in accordance with an embodiment of the present invention; and
- a generate_latency_table procedure 264 that generates a latency table 266 that associates sets of latency values with the memory levels; in a preferred embodiment, the latency table 266 associated sets of latency values with each particular level of memory in the memory hierarchy.

Figure 13:
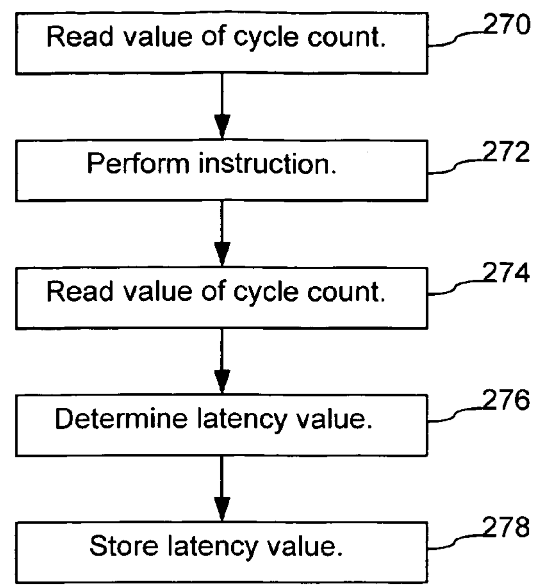
FIG. 13 is a flowchart of a latency sampling procedure of FIG. 12.

FIG. 13 is a flowchart of a method of measuring the memory latency of load and store instructions implemented by the measure_load_latency procedure 260 and the measure_store_latency procedure 262 of FIG. 12. When the interpreter 76 (FIG. 12) determines that a load or a store instruction is to be interpreted, the interpreter 76 (FIG. 12) invokes the measure_load_latency procedure 260 or the measure_store_latency procedure 262 of FIG. 12, respectively. In step 270, the respective procedure reads a pre-access value of the cycle counter 250 (FIG. 12). The pre-access value represents a time before the load or store instruction is executed, and is measured in the number of clock cycles by reading the value of the cycle counter 250 (FIG. 12). The load or store instruction is then performed (272), depending on the type of memory access and the procedure being executed. In step 274, the respective procedure reads a post-access value of the cycle counter 250 (FIG. 1). In step 276, the value of the memory latency is determined; and, in step 278, the value of the memory latency is stored in the first database 84 (FIG. 12). The value of the memory latency may be stored using any of the methods described above, including a hotlist 96 (FIG. 12).

Figure 14:
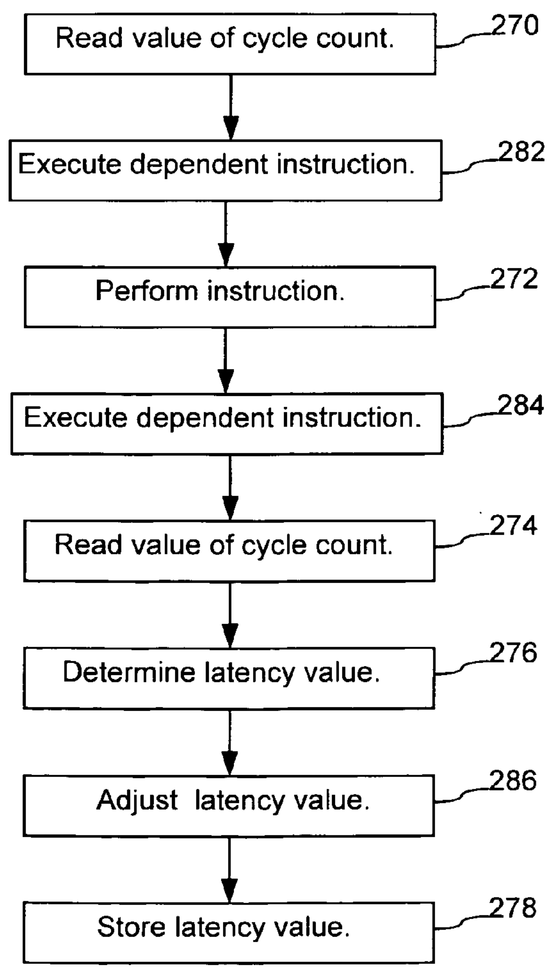
FIG. 14 is a flowchart of a latency sampling procedure of FIG. 12 in accordance with an alternate embodiment of the present invention.

FIG. 14 is an alternate embodiment of the method of measuring the memory latency of FIG. 13 that prevents unwanted out-of-order execution of the instructions in the measure_load_latency procedure 260 and the measure_store_latency procedure 262. This method is especially useful in systems that can execute multiple instructions simultaneously. To ensure that the instructions of the measure_load_latency procedure 260 and the measure_store_latency procedure 262 are performed in a specified order, dependent instructions are included and executed. Since FIG. 14 is the same as FIG. 13 except for the dependent instructions, the differences will be described. After reading the pre-access value of the cycle counter in step 270, in step 282, one or more dependent instructions are executed. After the dependent instructions are executed in step 282, the load or store instruction is performed (step 272). After performing the load or store instruction, in step 284, one or more dependent instructions are executed. In step 276, the latency value is determined. In step 286, to increase the precision of the measured memory latency, the latency value is adjusted by subtracting an adjustment factor that is equal a number of cycles that are attributable to execution of the dependent instructions to enforce the desired ordering of the instructions. The adjustment factor has a predetermined value.

An exemplary implementation of the measure_load_latency procedure 260 (FIG. 12) is shown below using assembly language pseudo-code. This procedure is executed on the Compaq Alpha processor during the interpretation of a sixty-four bit load instruction (Idq).

```
measure_load_latency:
/* entry: a0=address for interpreted load; */
/* a1=location to save loaded value; */
/* a2=location to save latency value; */
/* exit: v0=0 if successful, otherwise DEFAULT (not shown) */
bis a0, a0, t0;        /*ensure address ready before starting*/
rpcc t1, t0;           /*record cycle counter before load*/
xor t1, a0, t2;        /*enforce ordering: rpcc before load*/
xor t1, t2, a0;        /*guarantees that the next ldq instruction cannot be issued until the
                       execution of the rpcc instruction completes*/
ldq v0, 0(a0);         /*execute load instruction*/
bis v0, v0, t0;        /*enforce ordering: load before rpcc*/
rpcc t3, v0;           /*record cycle counter after load*/
subq t3, t1, t4;       /*compute latency = cycle counter before load – cycle counter after
                       load */
zapnot t4, 0xf, t4;    /*discard the hi-order 32 bits of the 64 bit register, zap to zero
                       every byte not in mask*/
stq t4, 0(a2);         /*save latency*/
stq v0, 0(a1);         /*save loaded value*/
bis zero, zero, v0;    /*interpretation successful*/
ret zero, (ra);        /*done*/
```

By way of example, the operation of each instruction in the exemplary procedure above, will be explained. The bis instruction performs an OR operation. For example, "bis a0, a0, t0" OR's the contents of the a0 register with the a0 register and stores the result of the OR instruction in the t0 register. The "rpcc t1, t0" instruction stores the value of the cycle counter in the t1 register. The "xor t1, a0, t2" instruction performs and exclusive-or operation between the content of the t1 and a0 registers and stores the result in the t2 register. The "subq t3, t1, t4" instruction subtracts the value in the t1 register from the value in the t3 register and stores the result in the t4 register. The "zapnot t4, 0xf, t4" instruction "zaps to zero" every byte of the t4 register not indicated by a bit in the mask 0xf (thus discarding the high order thirty-two bits of the sixty-four bit t4 register) and stores the result back in the t4 register. The "stq t4, 0(a2)" instruction saves the value in the t4 register at the memory address specified by the value in the a2 register. The "ret zero, (ra)" instruction returns to the location specified by the contents of the return address (ra) register.

In accordance with an embodiment of the present invention, the xor instructions force a dependency with respect to the t1 register and the a0 register and therefore guarantee that the value of the cycle counter is stored prior to performing the load instruction. The bis instruction immediately after the load (Idq) ensures that the load completes before the post-access value of the cycle counter is read.

In an alternate embodiment, the instructions to force a dependency are not used. In another alternate embodiment, an instruction to force a dependency may be inserted prior to the load or store instruction, but not after the load or store instruction. Alternately, an instruction to force a dependency may be inserted after the load or store instruction, but not prior to the load or store instruction. More generally, dependency instructions are used only when and where needed to ensure that steps 270, 272 and 274 are executed in their proper order.

An exemplary implementation of the measure_store_latency procedure 260 (FIG. 12) is shown below using assembly language pseudo-code. This assembly language procedure is executed on the Compaq Alpha processor and is used during the interpretation of a sixty-four bit load instruction (ldq).

measure_store_latency:
/*entry: a0=address for interpreted store; */
/*a1=location to save stored value; */
/*a2=location to save latency value; */
/*exit: v0=0 if successful, otherwise DEFAULT (not shown)*/

In step 292, at the start of profiling, the profiling procedure 70 (FIG. 1) invokes the generate latency table procedure 264 (FIG. 12) to generate the latency table 266 (FIG. 12) that stores a set of latency values for each level of the memory hierarchy. In one embodiment, the levels of the memory hierarchy have different sizes. From smallest to largest, the sizes of the memory levels increase as follows: the L1 cache, the L2 cache, the board-level cache, the DRAM memory and memory on the remote computer.

The memory-mapped device register is accessed like a memory location, and may or may not be cached. That is, the processor may always access the device itself, or it may treat the register like another piece of memory. Typically, a memory-mapped device register has a longer access latency than local DRAM memory, and a shorter access latency than the memory on a remote machine.

```
measure_store_latency:
/*entry: a0=address for interpreted store; */
/*a1= location to save stored value; */
/*a2=location to save latency value; */
/*exit: v0=0 if successful, otherwise DEFAULT (not shown) */
bis a0, a0, t0;      /*ensure address ready before starting*/
rpcc t1, t0;         /*record cycle counter before store*/
xor t1, a0, t2;      /*enforce ordering: rpcc before store*/
xor t1, t2, a0;      /*guarantees that the next store instruction cannot be issued until
                     the execution of the rpcc instruction completes*/
stq v0, 0(a0);       /*execute store instruction*/
mb;                  /*memory barrier instruction to enforce ordering: store before rpcc*/
rpcc t3, v0;         /*record cycle counter after store*/
subq t3, t1, t4;     /*compute latency = cycle counter before store – cycle counter after
                     store*/
zapnot t4, 0xf, t4;  /*discard the hi-order 32 bits of the 64 bit register, zap to zero
                     every byte not in mask*/
stq t4, 0(a2);       /*save latency*/
stq v0, 0(a1);       /*save stored value*/
bis zero, zero, v0;  /*interpretation successful*/
ret zero, (ra);      /*done*/
```

For the measure_store_latency procedure 262 (FIG. 12), a store instruction replaces the load instruction of the measure_load_latency procedure 260 (FIG. 12), and a memory barrier instruction follows the store to enforce ordering. The use of the memory barrier instruction in this particular way is a function of the processor pipeline implementation. In other systems, other techniques may be used to ensure ordering.

In an alternate embodiment, the dependency instructions, such as the xor and the memory barrier instruction are used only when and where needed to ensure that steps 270, 272 and 274 are executed in their proper order.

In a preferred embodiment, the measure_load_latency procedure 260 and the measure_store_latency procedure 262 are written such that both instructions that read the cycle counter (rpcc) are on the same instruction cache line to avoid incurring additional cycles in the latency value.

Figure 15:
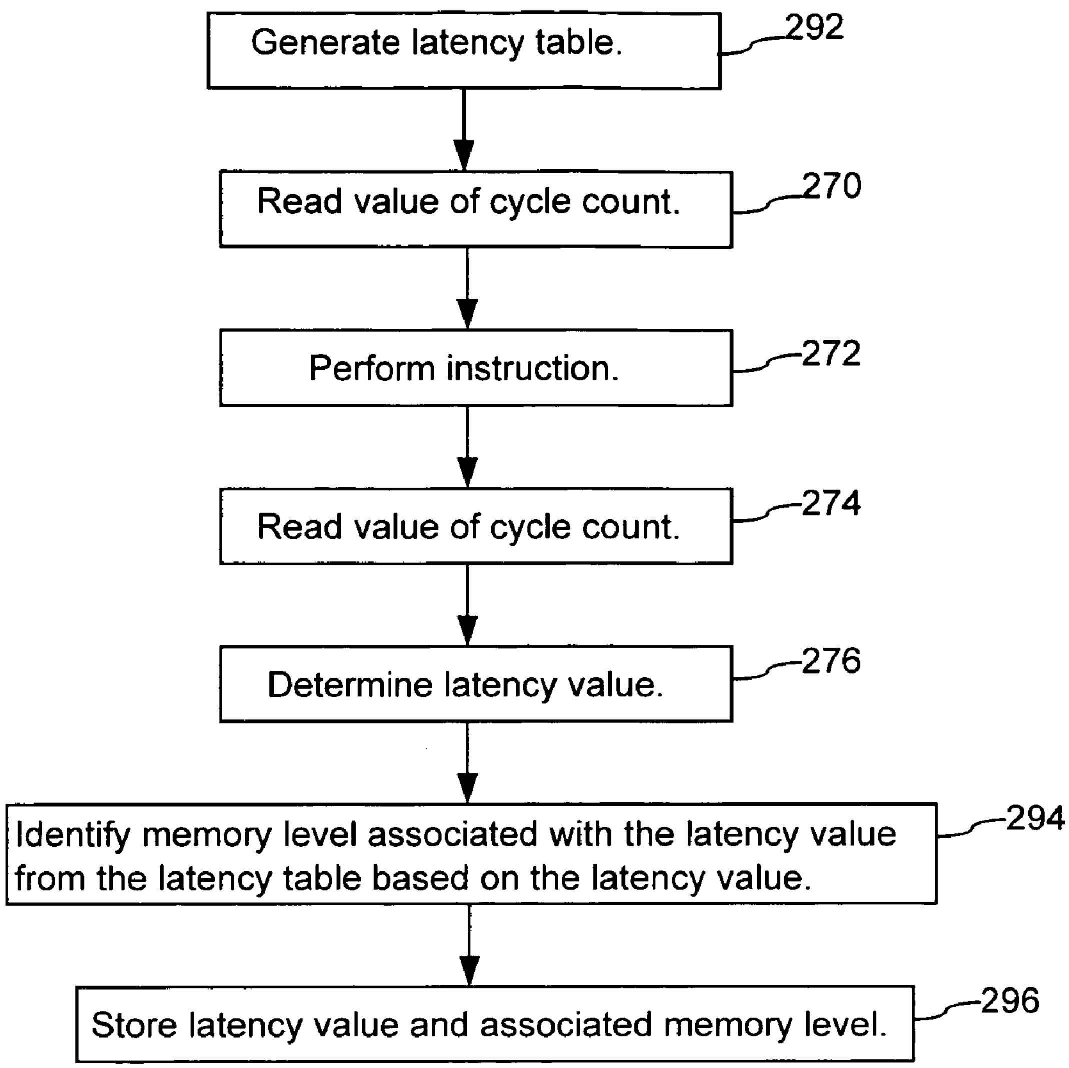
FIG. 15 is a flowchart of a method of identifying a memory level based on a latency value in accordance with an embodiment of the present invention.

In FIG. 15, in another alternate embodiment, for load operations, the measure_load_latency procedure 260 determines and stores the level of the memory hierarchy that satisfied the load, such as the L1 cache 251 (FIG. 12), L2 cache 252 (FIG. 12), board-level cache 254 (FIG. 12), local DRAM memory 24 (FIG. 12), or memory on a remote processor 259 (FIG. 12) across a network. Steps 270–276 are the same as in FIG. 13 and will not be described.

The generate_latency_table procedure 264 (FIG. 12) automatically generates the latency table 266 (FIG. 12) by repeatedly accessing blocks of data with a working set that is larger than a particular cache size. The memory latencies associated with executing a predetermined number of load instructions associated with the blocks are measured and stored in the table. In one embodiment, the set of latency values includes a set of discrete values for a respective level. In an alternate embodiment, the set of latency values for each respective memory level is a range with an upper and lower limit.

After executing step 276, in step 294, the measure_load_latency procedure 264 (FIG. 12) compares the latency value of a load instruction of a program being profiled to the values in the latency table to identify the associated memory level. In step 296, the measure_load_latency procedure 264 (FIG. 12) stores the latency value and associated memory level.

The latency of sampled memory store operations, indicates the cost of any write-buffer stalls or other queuing delays. In another embodiment, the latency of sampled memory operations that access the memory-mapped registers 256 (FIG. 12) associated with I/O devices 258 (FIG. 12) is measured and stored.

Once the memory latencies are captured, the memory latencies can be stored in a buffer for subsequent classification and analysis. For higher performance, it may be desirable to aggregate value samples in an accumulating data structure, such as the table used in Compaq's DCPI system as described in U.S. Pat. No. 5,796,939, which is hereby incorporated by reference.

Figure 16:
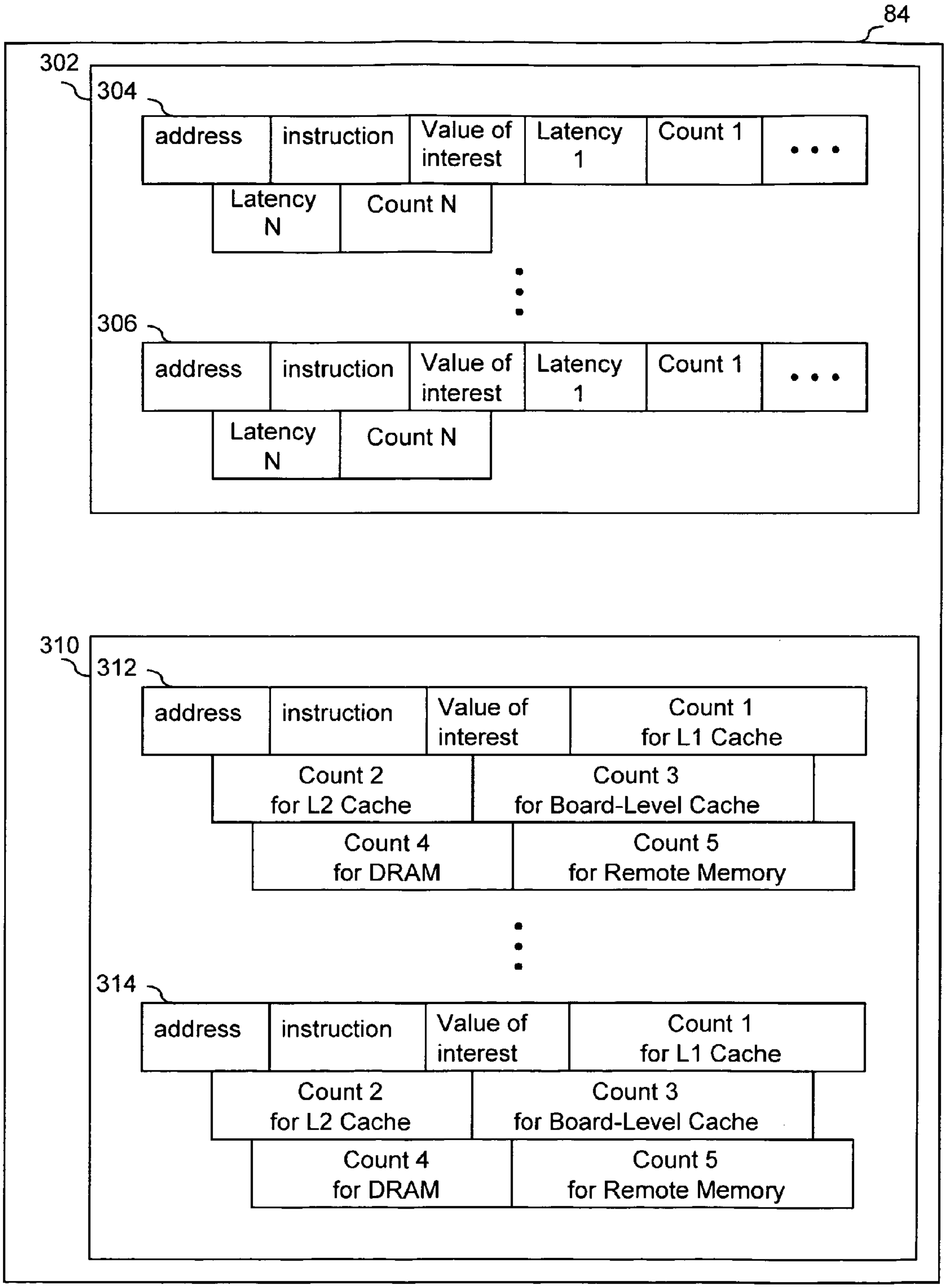
FIG. 16 is a diagram showing exemplary tuples of memory latency data stored in the first database.

In FIG. 16, exemplary tuples are stored in the first database 84. In one embodiment, a set 302 of tuples, 304 and 306, store an address, instruction, one or more values of interest, a first latency value (Latency 1) with an associated first count value (Count 1), up to and including an n'th latency value (Latency N) with an associated n'th count value (Count N). The count values represent the number of times that the instruction at the stored address incurred the associated latency value.

In another embodiment, the level in the memory hierarchy is identified and stored for one or more instructions. Each level is associated with an indicator and an associated count of hits for that level is stored for each indicator. A set 310 of tuples, 312 and 314, store an address, instruction, one or more values of interest, a count (Count 1) associated with accesses to the L1 cache, a count (Count 2) associated with accesses to the L2 cache, a count (Count 3) associated with accesses to the board-level cache indicator, and a count (Count 4) associated with accesses to the DRAM memory, and a count (Count 5) associated with accesses to the remote memory.

In yet another embodiment, the memory latency value profiles use the method for maintaining sets of frequently occurring values and their relative frequencies in a hotlist as described above. The methods described above can be applied to maintain hotlists of load latencies, and hotlists of tuples including load latencies with associated context information. The hotlists can by indexed by a program counter value, referenced memory address or both. Hotlists can be maintained and updated incrementally in the interrupt handler. Alternately, hotlists can be maintained and updated in a post-processing stage, such as by the user-mode daemon process, described above with reference to FIG. 2.

The memory latency data can be used to optimize system and program performance. Load latency profiles can guide manual performance tuning and debugging, and can drive automatic optimizations such as prefetching. For example, it can take a relatively long time to fetch a variable, but it may be possible to hide this latency if the compiler inserts a prefetch instruction to put the variable into a level of the cache hierarchy that has a shorter memory access time. If the load latency profile shows that an access of a variable often incurs a cache miss, the access of the variable might be a candidate for a prefetch instruction. For instance, the code may include the following instructions:

```
if (cond) {
  a[i]++;
}
```

To retrieve the value of the array element a[i], the compiler will generate a load instruction in the object code. The profiling system is executed for this code and a profile is generated. The profile includes latency, memory level and associated cache miss data. If the profile shows that the load of array element a[i] often caused a cache miss, and that the condition (cond) was usually true, the compiler automatically places a prefetch of array element a[i] above the if-statement. The load of the array element a[i] is determined to often cause a cache miss when the number of cache misses in the profile exceeds a predetermined cache miss threshold. The condition (cond) is determined to be usually true when the number of times that the condition (cond) is true exceeds a predetermined condition threshold.

The data collected by memory latency profiling can be used to improve the performance of systems and applications. For example, load latency profiles can guide manual performance tuning and debugging, and can also drive automatic optimizations such as prefetching. Load latency profiles indexed by the referenced memory address can also reveal high contention for one or more particular cache lines or data structures, or that a certain memory-mapped device register is a bottleneck.

CONCLUSION

The methods for interrupt driven memory latency sampling, described above, achieve efficient, transparent and flexible latency profiling. The present invention has several advantages. First, the present invention works on unmodified executable object code thereby enabling profiling on production systems. Second, entire system workloads can be profiled, not just single application programs thereby providing comprehensive coverage of overall system activity that includes the profiling of shared libraries, the kernel and device-drivers. Third, the interrupt driven approach of the present invention is faster than instrumentation-based value profiling by several orders of magnitude.

The instruction interpretation approach provides additional flexibility, enabling the use of custom downloadable scripts to identify and store latencies of interest. The data collected by latency profiling is used to improve the performance of systems and application programs. Memory latency profiles guide manual performance tuning and debugging, drive automatic optimizations such as prefetching. The cross-application and modification of statistical methods originally designed for databases enhances the quality of latency profiles, providing an improved statistical basis for analysis and optimizations.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of monitoring the performance of a program being executed on a computer system, comprising:

executing the program on a computer system, the program having object code instructions;

at intervals interrupting execution of the program, including delivering a first interrupt; and in response to at least a subset of the first interrupts, measuring a latency of execution of a particular object code instruction, storing the latency in a first database, the particular object code instruction being executed by the computer such that the program remains unmodified.

2. The method of claim 1 wherein measuring the latency includes:

determining an Initial value of a cycle counter;

performing the particular object code instruction;

determining a final value of the cycle counter; and measuring the latency based on the initial value and the final value.

3. The method of claim 2 further comprising:

executing at least one instruction selected from the set consisting of (A) an instruction for ensuring that the particular object code instruction is performed after the initial value of the cycle counter is determined, and (B)

an instruction for ensuring that the particular object code instruction is performed before the final value of the cycle counter is determined.

4. The method of claim 2 further comprising:

applying an adjustment to the final value.

5. The method of claim 1 wherein the particular object code instruction has a variable execution time.

6. The method of claim 1 wherein the particular object code instruction is a memory access instruction.

7. The method of claim 1 wherein the computer system includes a plurality of memory units, each memory unit of the plurality of memory units having a different range of access times, and further comprising:

associating the particular object code instruction with a memory unit in accordance with the latency and the range of access times for the memory unit.

8. The method of claim 1 wherein measuring the latency includes:

determining an initial value of a cycle counter;

executing a first dependent instruction to provide a predetermined execution order;

performing the particular object code instruction;

executing a second dependent instruction to provide the predetermined execution order;

determining a final value of the cycle counter; and determining the latency based on the initial value and the final value.

9. The method of claim 8 wherein the first and second dependent instructions are memory barrier instructions.

10. The method of claim 1 wherein measuring includes:

identifying at least one issue block of instructions; and interpreting the instructions of the at least one issue block;

wherein said particular object code instruction is in the issue block.

11. The method of claim 10 wherein said interpreting emulates a machine language instruction set of the computer system.

12. The method of claim 10 wherein said interpreting updates a state of the interrupted program as though each interpreted instruction had been directly executed by the computer system.

13. A computer program product for sampling latency of a computer program having object code instructions while the object code instructions are executing without modifying the computer program, the computer program product for use in conjunction with a computer system, the computer program product comprising a computer readable storage medium and a computer program mechanism embedded therein, the computer program mechanism comprising:

one or more instructions to deliver interrupts at intervals during execution of the program, including delivering a first interrupt;

one or more instructions to measure a latency of execution of a particular object code instruction; and one or more instructions to, in response to at least a subset of the first interrupts, store the latency value for the particular object code instruction in a first database.

14. The computer program product of claim 13 wherein said one or more instructions to measure the latency value include instructions to:

determine an initial value of a cycle counter;

perform the particular object code instruction;

determine a final value of the cycle counter; and measure the latency based on the initial value and the final value.

15. The computer program product of claim 14 further comprising one or more instructions to apply an adjustment to the final value.

16. The computer program product of claim 13 further comprising at least one instruction selected from the set consisting of (A) an instruction for ensuring that the particular object code instruction is performed after the initial value of the cycle counter is determined, and (B) an instruction for ensuring that the particular object code instruction is performed before the final value of the cycle counter is determined.

17. The computer program product of claim 13 wherein the particular object code instruction has a variable execution time.

18. The computer program product of claim 13 wherein the particular object code instruction is a memory access instruction.

19. The computer program product of claim 13 wherein the computer system includes a plurality of memory units, each memory unit of the plurality of memory units having a different range of access times, and further comprising one or more instructions that associate the particular object code instruction with a memory unit in accordance with the latency value and the range of access times for the memory unit.

20. The computer program product of claim 13 wherein said one or more instructions to measure the latency value include:

one or more instructions to determine an initial value of a cycle counter;

a first dependent instruction to provide a predetermined execution order;

the particular object code instruction;

a second dependent instruction to provide the predetermined execution order;

one or more instructions to determine a final value of the cycle counter; and one or more instructions to measure the latency value based on the initial value and the final value.

21. The computer program product of claim 19 wherein the first and second dependent instructions are memory barrier instructions.

22. The computer program product of claim 13 wherein said instructions to measure include:

one or more instructions that identify at least one issue block of instructions; and an interpreter to interpret the instructions of the at least one issue block;

wherein said particular object code instruction is in the issue block.

23. The computer program product of claim 22 wherein the interpreter emulates a machine language instruction set of the computer system.

24. The computer program product of claim 22 wherein the interpreter updates a state of the interrupted program as though each interpreted instruction had been directly executed by the computer system.

25. A computer system comprising:

a processor for executing instructions; and a memory storing Instructions including:

one or more instructions to deliver interrupts at intervals during execution of the program, including delivering a first interrupt;

one or more instructions to measure a latency of execution of a particular object code instruction; and one or more instructions to, in response to at least a subset of the first interrupts, store the latency value for the particular object code instruction in a first database.

26. The computer system of claim 25 wherein said one or more instructions to measure the latency value include instructions to:

determine an initial value of a cycle counter;

perform the particular object code instruction;

determine a final value of the cycle counter; and measure the latency based on the initial value and the final value.

27. The computer system of claim 25 wherein the memory further comprises at least one instruction selected from the set consisting of (A) an instruction for ensuring that the particular object code instruction is performed after the initial value of the cycle counter is determined, and (B) an instruction for ensuring that the particular object code instruction is performed before the final value of the cycle counter is determined.

28. The computer system of claim 26 wherein the memory further comprises one or more instructions to apply an adjustment to the final value.

29. The computer system of claim 25 wherein the particular object code instruction has a variable execution time.

30. The computer system of claim 25 wherein the particular object code instruction is a memory access instruction.

31. The computer system of claim 25 further comprising:

a plurality of memory units, each memory unit of the plurality of memory units having a different range of access times, and wherein the memory further comprises one or more instructions that associate the particular object code instruction with a memory unit in accordance with the latency value and the range of access times for the memory unit.

32. The computer system of claim 25 wherein said one or more instructions to measure the latency value include:

one or more instructions to determine an initial value of a cycle counter;

a first dependent instruction to provide a predetermined execution order;

the particular object code instruction;

a second dependent instruction to provide the predetermined execution order;

one or more instructions to determine a final value of the cycle counter; and one or more instructions to measure the latency value based on the initial value and the final value.

33. The computer system of claim 32 wherein the first and second dependent instructions are memory barrier instructions.

34. The computer system of claim 25 wherein said instructions to measure include:

one or more instructions that identify at least one issue block of instructions; and an interpreter to interpret the instructions of the at least one issue block;

wherein said particular object code instruction is in the issue block.

35. The computer system of claim 34 wherein the interpreter emulates a machine language instruction set of the computer system.

36. The computer system of claim 34 wherein the interpreter updates a state of the interrupted program as though each interpreted instruction had been directly executed by the computer system.

* * * * *

UNITED STATES PATENT AND TRADEMARK OFFICE

CERTIFICATE OF CORRECTION

PATENT NO. : 6,961,930 B1

APPLICATION NO. : 09/540952
DATED : November 1, 2005
INVENTOR(S) : Carl A. Waldspurger et al.

It is certified that error appears in the above-identified patent and that said Letters Patent is hereby corrected as shown below:

In column 11, line 10, delete “(bibs)” and insert -- (blbs) --, therefor.

In column 11, line 12, delete “bibs” and insert -- blbs --, therefor.

In column 11, line 14, delete “(Isb)” and insert -- (lsb) --, therefor.

In column 26, line 9, delete “(Idq)” and insert -- (ldq) --, therefor.

In column 26, line 61, delete “(Idq)” and insert -- (ldq) --, therefor.

In column 27, line 11, delete “(Idq)” and insert -- (ldq) --, therefor.

In column 30, line 58, in Claim 2, delete “Initial” and insert -- initial --, therefor.

In column 32, line 41, in Claim 21, delete “claim 19” and insert -- claim 20 --, therefor.

In column 32, line 62, in Claim 25, delete “Instructions” and insert -- instructions --, therefor.

Signed and Sealed this

Eighteenth Day of August, 2009

David J. Kappos

David J. Kappos
*Director of the United States Patent and Trademark Office*